United States Patent
Wang et al.

(10) Patent No.: US 10,701,723 B2
(45) Date of Patent: Jun. 30, 2020

(54) DEMODULATION REFERENCE SIGNAL WITH LOW PEAK-TO-AVERAGE POWER RATIO AND ALLOCATION INFORMATION WITH GRANULARITY

(71) Applicant: QUALCOMM Incorporated, San Diego, CA (US)

(72) Inventors: Renqiu Wang, San Diego, CA (US); Hao Xu, Beijing (CN); Wei Zeng, San Diego, CA (US); Seyong Park, San Diego, CA (US); Wanshi Chen, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/699,687

(22) Filed: Sep. 8, 2017

(65) Prior Publication Data

US 2018/0131485 A1 May 10, 2018

Related U.S. Application Data

(60) Provisional application No. 62/418,079, filed on Nov. 4, 2016.

(51) Int. Cl.
*H04W 4/00* (2018.01)
*H04W 72/12* (2009.01)
(Continued)

(52) U.S. Cl.
CPC ...... *H04W 72/1284* (2013.01); *H04B 7/0632* (2013.01); *H04L 1/1861* (2013.01);
(Continued)

(58) Field of Classification Search
CPC .................................................. H04W 72/1284
See application file for complete search history.

(56) References Cited

U.S. PATENT DOCUMENTS 10,257,807 B2 * 4/2019 Yi ........................ H04W 72/005
2008/0117867 A1 5/2008 Yin et al.
(Continued)

FOREIGN PATENT DOCUMENTS

EP 3236610 A1 10/2017
WO 2011053836 A2 5/2011
(Continued)

OTHER PUBLICATIONS

International Search Report and Written Opinion—PCT/US2017/050955—ISA/EPO—dated Apr. 16, 2018.
(Continued)

*Primary Examiner* — Gerald A Smarth
(74) *Attorney, Agent, or Firm* — Nerrie M. Zohn; Arent Fox LLP

(57) ABSTRACT

A first apparatus may determine a demodulation reference signal (DMRS) sequence based on a mother sequence, map the DMRS sequence to at least a first symbol of a set of resource blocks (RBs) in a transmission, and send a DMRS including the mapped DMRS sequence in the at least one symbol of the set of RBs. A second apparatus may receive information associated with resource allocation, determine a granularity based on the information associated with resource allocation, determine resource allocation based at least in part on the granularity, and receive a signal carried on resources corresponding to the resource allocation.

31 Claims, 18 Drawing Sheets

(51) Int. Cl.
*H04L 1/18* (2006.01)
*H04L 5/00* (2006.01)
*H04W 52/36* (2009.01)
*H04B 7/06* (2006.01)
*H04W 72/04* (2009.01)
*H04L 1/00* (2006.01)
*H04W 76/27* (2018.01)

(52) U.S. Cl.
CPC .......... *H04L 5/0048* (2013.01); *H04L 5/0051* (2013.01); *H04L 5/0055* (2013.01); *H04L 5/0057* (2013.01); *H04W 52/36* (2013.01); *H04W 52/365* (2013.01); *H04W 72/0413* (2013.01); *H04W 72/0453* (2013.01); *H04L 1/0026* (2013.01); *H04L 1/0073* (2013.01); *H04L 5/001* (2013.01); *H04L 5/0007* (2013.01); *H04W 76/27* (2018.02)

(56) References Cited

U.S. PATENT DOCUMENTS

| | | | |
|---|---|---|---|
| 2010/0157918 A1 | 6/2010 | Kim et al. | |
| 2011/0110357 A1* | 5/2011 | Chung | H04W 48/08 370/344 |
| 2012/0250656 A1* | 10/2012 | Noh | H04L 5/0023 370/330 |
| 2013/0107985 A1 | 5/2013 | Jang et al. | |
| 2013/0114756 A1 | 5/2013 | Jia et al. | |
| 2014/0219202 A1* | 8/2014 | Kim | H04L 1/1861 370/329 |
| 2015/0312009 A1 | 10/2015 | Nissila et al. | |
| 2016/0100398 A1 | 4/2016 | Xia et al. | |
| 2016/0127093 A1 | 5/2016 | Jiang et al. | |
| 2016/0211959 A1 | 7/2016 | Jöngren et al. | |
| 2016/0360518 A1* | 12/2016 | Noh | H04L 27/2607 |
| 2017/0005772 A1 | 1/2017 | Takeda et al. | |
| 2017/0238272 A1 | 8/2017 | You et al. | |
| 2017/0374675 A1 | 12/2017 | Hwang et al. | |
| 2018/0132269 A1 | 5/2018 | Wang et al. | |
| 2019/0373597 A1 | 12/2019 | Bendlin et al. | |

FOREIGN PATENT DOCUMENTS

| | | |
|---|---|---|
| WO | 2016099135 A1 | 6/2016 |
| WO | 2016148835 A1 | 9/2016 |

OTHER PUBLICATIONS

Partial International Search Report—PCT/US2017/050955—ISA/EPO—dated Feb. 7, 2018.

* cited by examiner

DEMODULATION REFERENCE SIGNAL WITH LOW PEAK-TO-AVERAGE POWER RATIO AND ALLOCATION INFORMATION WITH GRANULARITY

CROSS-REFERENCE TO RELATED APPLICATION(S)

This application claims the benefit of U.S. Provisional Application Ser. No. 62/418,079, entitled "DEMODULATION REFERENCE SIGNAL WITH LOW PEAK-TO-AVERAGE POWER RATIO" and filed on Nov. 4, 2016, which is expressly incorporated by reference herein in its entirety.

BACKGROUND

Technical Field

The present disclosure relates generally to communication systems, and more particularly, to a system having a demodulation reference signal with a low peak-to-average power ratio.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a first method, a first computer-readable medium, and a first apparatus are provided. The first apparatus may determine a demodulation reference signal (DMRS) sequence based on a mother sequence. The first apparatus may map the DMRS sequence to at least one symbol of a set of resource blocks (RBs) in a transmission. The first apparatus may send a DMRS including the mapped DMRS sequence in the at least one symbol of the set of RBs.

In an aspect of the disclosure, a second method, a second computer-readable medium, and a second apparatus are provided. The second apparatus may receive information associated with resource allocation, determine a granularity based on the information associated with resource allocation, determine resource allocation based at least in part on the granularity, and receive a signal carried on resources corresponding to the resource allocation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
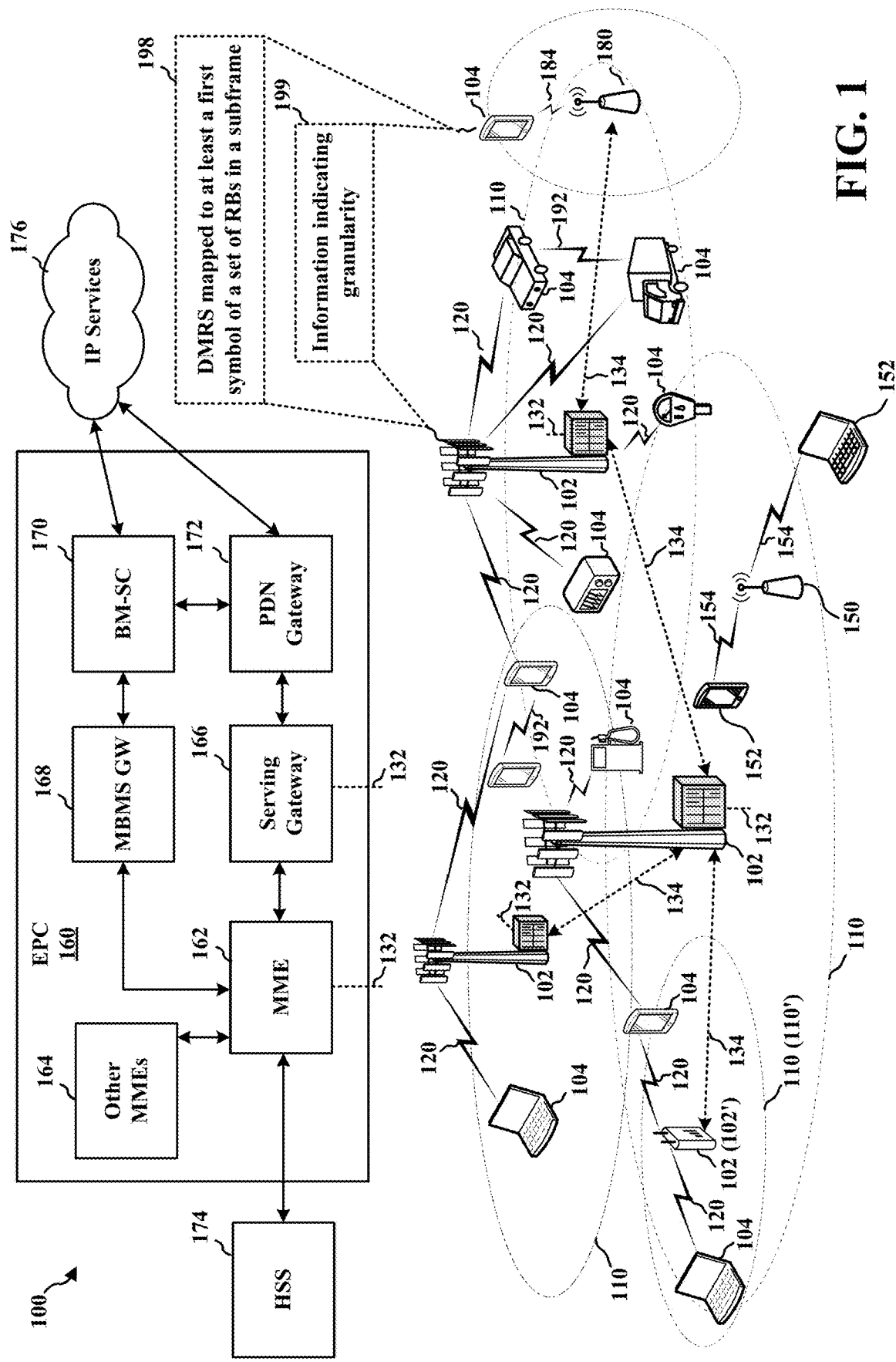
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may map send a demodulation reference signal (DMRS) to at least one symbol, e.g., a first symbol, of a set of resource blocks (RBs) in a transmission, and the first symbol may occur at the beginning of the transmission. The UE 104 may then send a DMRS 198 that includes the mapped DMRS sequence in the at least one symbol, e.g., the first symbol of the set of RBs. In an aspect, the UE 104 may determine the DMRS sequence based on a mother sequence.

In another aspect, the base station 102 may determine allocation information associated with the UE 104. The base station 102 may determine a starting RB (e.g., an RB index), a number of RBs (e.g., an allocation size), and information associated with a granularity. The granularity may include a number of RBs. The base station 102 may send, to the UE 104, information indicating the allocation information. The information indicting the allocation information may include information indicating a granularity 199. In an aspect, the information indicating the granularity 199 may include a granularity index. In an aspect, the DMRS sequence may be a segment of a mother sequence determined by the RB allocations.

Figure 2:
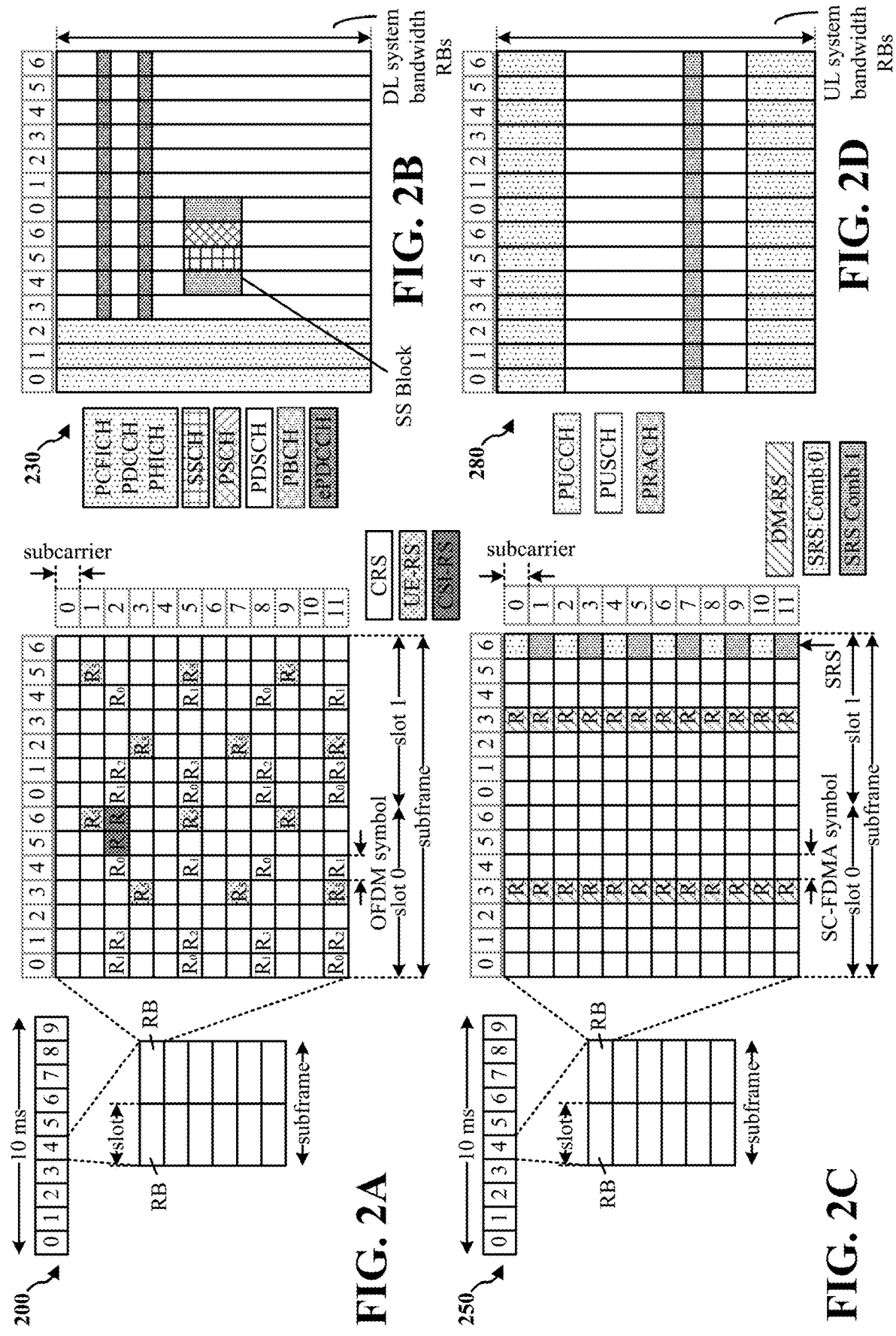
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DMRS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
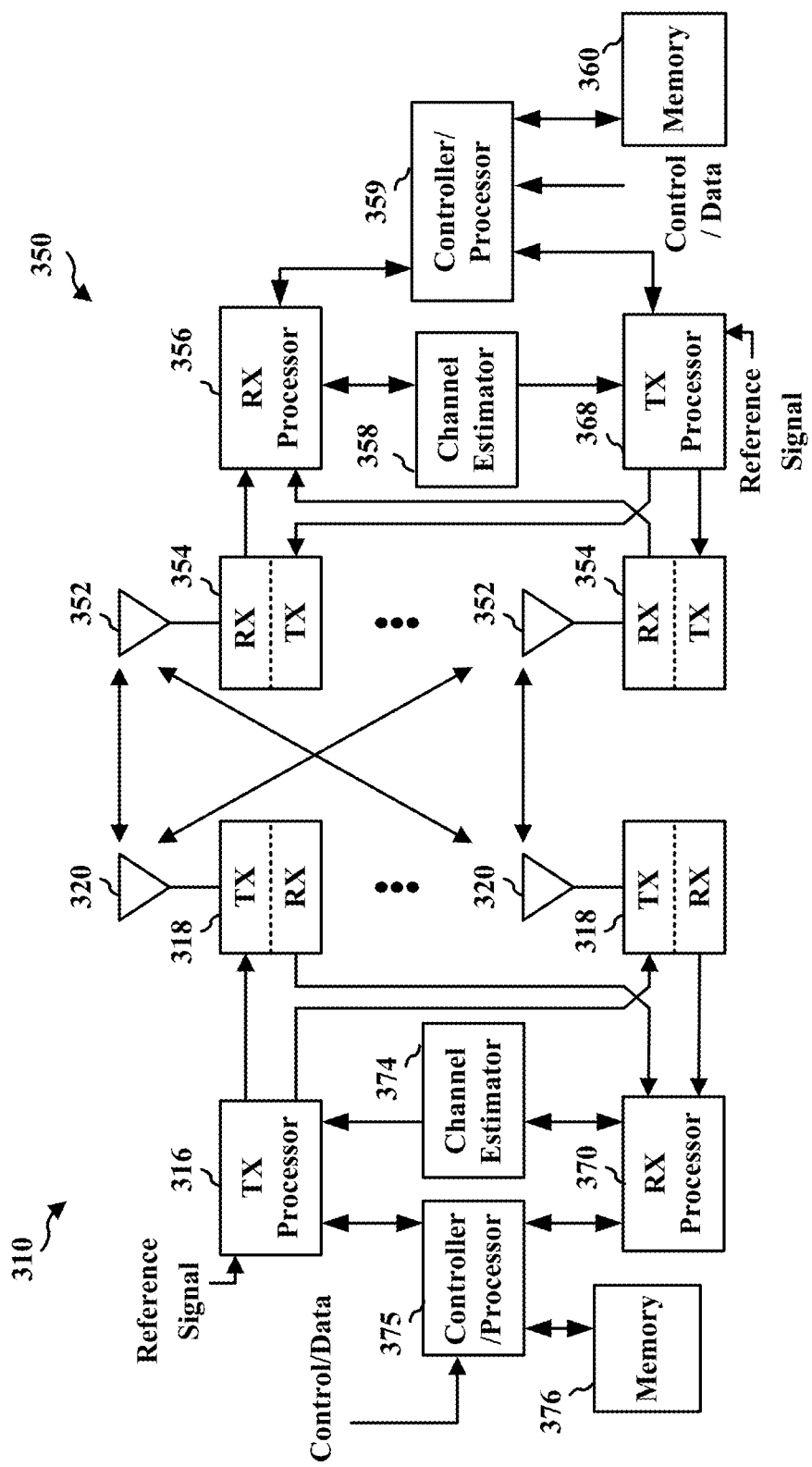
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
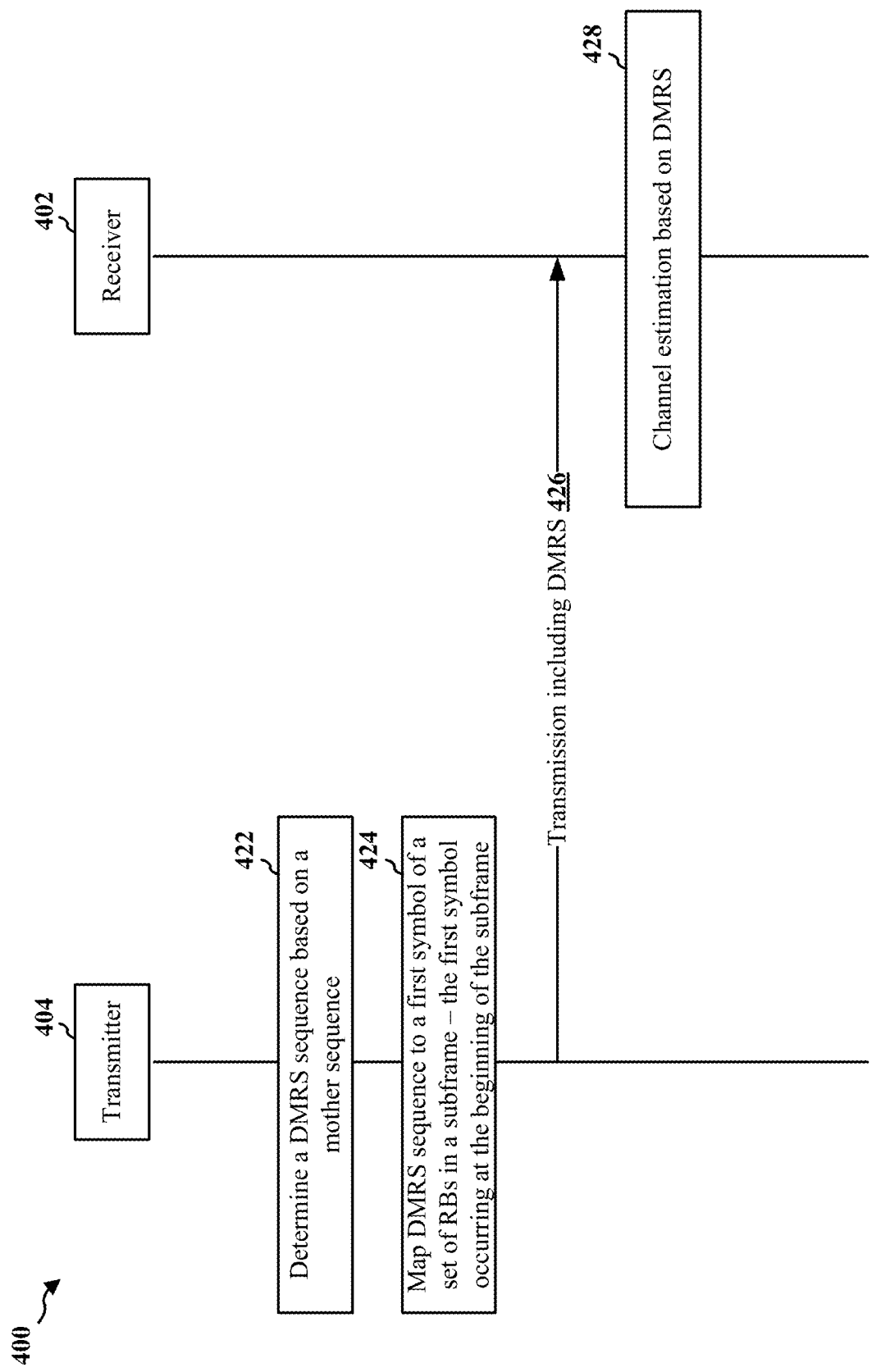
FIG. 4 is a call flow diagram of a method of wireless communication.

FIG. 4 is a call flow diagram of a method 400 of wireless communication. The method 400 may be performed by a transmitter 404 and a receiver 402. In various aspects, the transmitter 404 may be a UE (e.g., the UE 104) and the receiver 402 may be a base station (e.g., the base station 102). In other aspects, the transmitter 404 may be a base station (e.g., the base station 102) and the receiver 402 may be a UE (e.g., the UE 104).

In an aspect, the transmitter 404 may determine 422 a DMRS sequence based on a mother sequence. For example, the DMRS sequence may be a segment of the mother sequence corresponding to the RB allocations. The mother sequence may be a predetermined QPSK sequence, Zadoff-Chu (ZC) sequence, or another type of sequence. The sequence may be defined in one or more technical specifications, for example, promulgated by 3GPP.

In one aspect, the transmitter 404 may apply a first shift to the mother sequence in order to determine 422 the DMRS sequence. The first shift may be applied for downlink communication (e.g., when the transmitter 404 is a base station). In another aspect, the transmitter 404 may apply a second shift to the mother sequence in order to determine 422 the DMRS sequence. The second shift may be applied for uplink communication (e.g., when the transmitter 404 is a UE). In one example, the first shift may be different from the second shift. In another example, the first shift may be the same as the second shift. In one aspect, the transmitter 404 may select a segment or portion of the mother sequence to use as the DMRS sequence. The transmitter 404 may select the segment or portion based on allocated RBs.

In an aspect, the transmitter 404 may determine 422 the DMRS sequence based on the mother sequence by dividing the mother sequence into a plurality of first segments, clipping each first segment of the plurality of first segments based on a first threshold, and filtering each first segment of the plurality of first segments after the clipping to form each second segment of a plurality of second segments. The transmitter 404 may then select or determine a second segment to use as the DMRS sequence. In a further aspect, the transmitter 404 may clip each second segment of the plurality of second segments based on a second threshold, and filter each second segment after the clipping of each second segment. The transmitter 404 may then select or determine one of the clipped and filtered second segments to use as the DMRS sequence. In an aspect, the transmitter 404 may select a segment (e.g., a first segment or a second segment) based on a peak-to-average-power ratio (PAPR) associated with that segment. For example, the transmitter 404 may select a segment with a lowest PAPR, or may select any segment with a PAPR under a PAPR threshold.

After determining a DMRS sequence, the transmitter 404 may map 424 the DMRS sequence to at least one symbol, e.g., the first symbol of a set of RBs in a transmission. The transmission may be DL transmission or UL transmission. If it's the UL transmission, it may be in UL long burst or UL short burst. The first symbol to which the DMRS sequence is mapped may occur at the beginning of the transmission, e.g., a UL long burst. In other words, the DMRS sequence may be "front-loaded." In one aspect, the transmitter 404 may map 424 the DMRS sequence to subcarriers in the first symbol in a comb structure. In an aspect, the subcarriers mapped 424 in the comb structure may be every other subcarrier. In another aspect, the subcarriers mapped in the comb structure may be evenly down-sampled subcarriers (e.g., every four subcarriers). In one aspect, the transmitter 404 may map 424 the DMRS sequence to a first set of subcarriers in a comb structure for a downlink DMRS (e.g., when the transmitter 404 is a base station). For example, the transmitter 404 may map 424 the DMRS sequence to a plurality of odd-indexed subcarriers (and not to any even-indexed subcarriers), such as every other subcarrier or every fourth subcarrier. In another aspect, the transmitter 404 may map 424 the DMRS sequence to a second set of subcarriers (different than the first set of every other subcarrier) in a comb structure for an uplink DMRS (e.g., when the transmitter 404 is a UE).

In one aspect, the transmitter 404 may map 424 the DMRS sequence to a first set of subcarriers in a comb structure for SC-FDM (e.g., for uplink DMRS). For example, the transmitter 404 may map 424 the DMRS sequence to a plurality of odd-indexed subcarriers (and not to any even-indexed subcarriers) for SC-FDM, such as every other odd-indexed subcarrier or every fourth odd-indexed subcarrier. In another aspect, the transmitter 404 may map 424 the DMRS sequence to a second set of subcarriers (different than the first set of every other subcarrier) in a comb structure for OFDM (e.g., for uplink DMRS).

After mapping the DMRS sequence to at least one symbol, e.g., a first symbol of a set of RBs, the transmitter 404 may send a transmission 426 (e.g., a subframe, uplink burst, etc.) having a DMRS that includes the DMRS sequence mapped to at least one symbol, e.g., the first symbol. The receiver 402 may receive the transmission 426 having the DMRS that includes the DMRS sequence mapped to at least one symbol, e.g., the first symbol. The receiver 402 may perform channel estimation 428 based on the received DMRS. For example, the receiver 402 may attempt to detect the DMRS sequence in the received transmission and may perform channel estimation based on the attempted detection. Channel estimation 428 may be used when the transmitter 404 sends further signals (e.g., on a PDCCH for downlink or a PUCCH for uplink) to the receiver 402.

Figure 5:
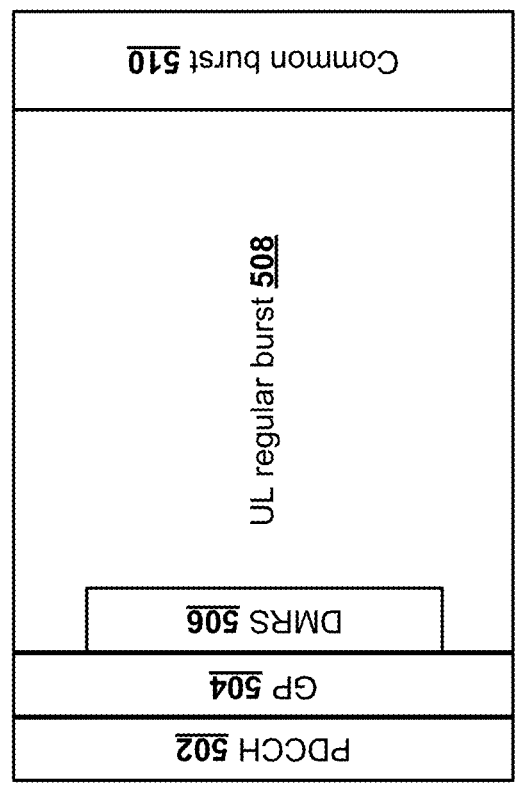
FIG. 5 is a diagram of an uplink-centric front-loaded DMRS.

FIG. 5 is a block diagram 500 of an uplink-centric signal. In an aspect, a PDCCH 502 may be received, e.g., by the UE 104 or transmitter 404 from the base station 102 or receiver 402. The PDCCH 502 may be followed by a guard period (GP) 504, for example, to allow the transmitter 404 to switch from reception to transmission.

The GP 504 may be followed by an uplink (UL) regular burst 508. The UL regular burst 508 may be sent by the transmitter 404 to the receiver 402, e.g., as part of the transmission 426. The transmitter 404 may include, in the UL regular burst 508, control and/or payload data from the transmitter 404. The UL regular burst 508 may include a DMRS sequence 506, which may indicate a DMRS sequence. The DMRS sequence 506 may be front-loaded—that is, the transmitter 404 may map the DMRS sequence included in the DMRS sequence 506 to at least a first symbol of a set of RBs corresponding to the UL regular burst 508 (e.g., in the transmission 426). The front-loaded DMRS sequence 506 may facilitate a faster turnaround (e.g., between subframes and/or for transmission/reception).

In an aspect, the DMRS sequence 506 may be based on RB locations (e.g., based on RBs corresponding to the UL regular burst 508), for example, instead of based on a number of RBs. Accordingly, once an RB index is known, the DMRS sequence 506 may be known. This approach may facilitate better interference information and/or cancellation, for example, when downlink and uplink interference occurs between neighbor cells with different uplink and/or downlink configurations. In one aspect, the uplink DMRS sequence 506 may be symmetrical to a downlink DMRS sequence, which may also be front-loaded in a downlink regular burst.

The UL regular burst 508 may be followed by a common burst 510 (e.g., UL common burst 510). The common burst 510 may include control and/or payload data. In one aspect, the transmitter 404 may include, in the common burst 510, UCI. For example, the common burst 510 may include ACK/NACK feedback.

Figure 6:
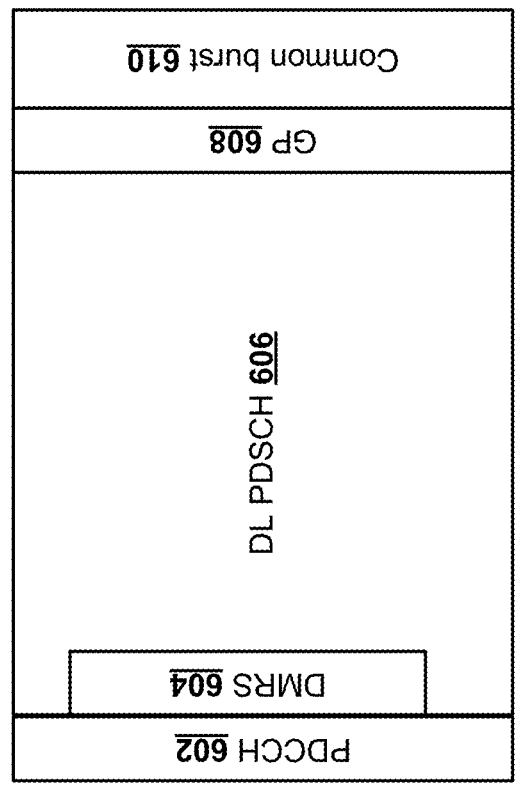
FIG. 6 is a diagram of a downlink-centric front-loaded DMRS.

FIG. 6 is a block diagram 600 of a downlink-centric signal. In an aspect, the signal may include a PDCCH 602. The base station 102 or transmitter 404 may transmit the PDCCH 602 to a UE 104 or receiver 402. The PDCCH 602 may be followed by a downlink (DL) PDSCH 606. The DL PDSCH 606 may be followed by a GP 608.

The GP 608 may be followed by a common burst 610. In an aspect, the common burst 610 may include control and/or payload data. For example, the common burst 610 may include ACK/NACK data.

The DL PDSCH 606 may include a DMRS sequence 604. The DMRS sequence 604 may be front-loaded—that is, the DMRS sequence 604 may be mapped to at least a first symbol of a set of RBs corresponding to the DL PDSCH 606. The front-loaded DMRS sequence 604 may facilitate quick turnaround (e.g., between subframes and/or for transmission/reception).

In an aspect, the DMRS sequence 604 may be based on RB locations (e.g., based on RBs corresponding to the DL PDSCH 606), for example, instead of based on a number of RBs. Accordingly, once an RB index is known, the DMRS sequence included in the DMRS sequence 604 may be known. This approach may facilitate better interference information and/or cancellation, for example, when downlink and uplink interference occurs between neighbor cells with different uplink and/or downlink configurations.

In an aspect, the transmitter 404 may transmit the DMRS sequence 604 in the DL PDSCH 606. In the downlink, a cell-specific reference signal (CRS) may be absent, and only the DMRS sequence 604 may occur.

Figure 7:
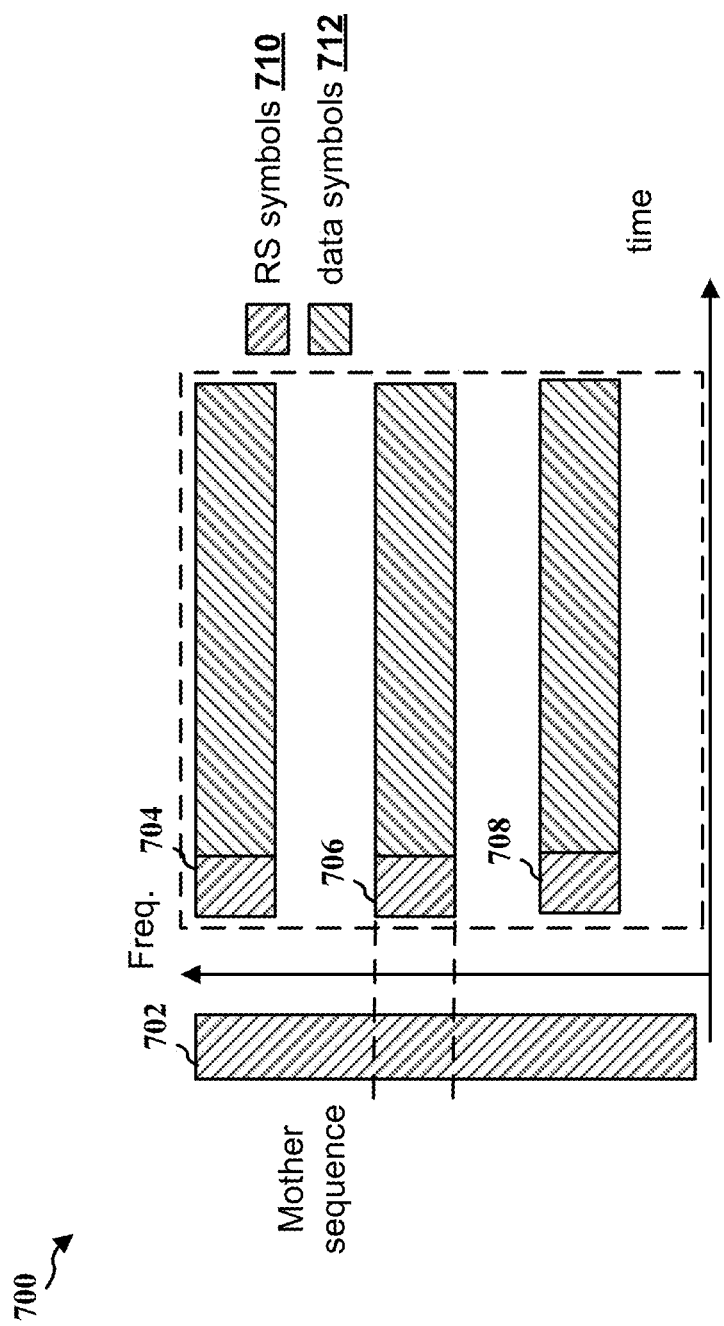
FIG. 7 is a diagram of a DMRS sequence design based on a mother sequence.

FIG. 7 illustrates an example 700 of a mother sequence upon which a DMRS sequence may be based. Aspects described with respect to FIG. 7 may be applicable to both a downlink DMRS sequence (e.g., the DMRS sequence 604) and an uplink DMRS sequence (e.g., the DMRS sequence 506). In an aspect, the mother sequence 702 may be a wideband sequence. The mother sequence 702 may be a preselected QPSK sequence or ZC sequence that has a relatively low PAPR (e.g., compared to at least one other sequence) when used for wideband transmission. In an aspect, the DMRS sequence as a segment of the mother sequence may also has a relatively low PAPR. In an aspect, the mother sequence 702 may also be a pseudo noise (PN) sequence.

In an aspect, a downlink DMRS sequence (e.g., the DMRS sequence 604) and an uplink DMRS sequence (e.g., the DMRS sequence 506) may use the same mother sequence 702. However, different cyclic shifts may be applied so that the downlink DMRS sequence is different from the uplink DMRS sequence. For example, the uplink DMRS sequence may be generated based on a first set of shifts to the mother sequence 702, whereas the downlink DMRS sequence may be generated based on a different set of shifts to the mother sequence 702. In an aspect, the DL and UL DMRS may also use the same mother sequence with the same shifts.

In an aspect, a DMRS sequence may have a comb structure. That is, a DMRS sequence may be transmitted on a evenly down-sampled subcarriers, e.g., every other subcarrier, in the DMRS symbol in a comb structure. However, a downlink DMRS sequence (e.g., the DMRS sequence 604) may use a first set of tones (e.g., even tones), whereas an uplink DMRS sequence (e.g., the DMRS sequence 506) may use a second set of tones (e.g., odd tones).

In an aspect, a waveform associated with the uplink DMRS sequence (e.g., the DMRS sequence 506) may be either SC-FDM or OFDM. In aspects, the uplink DMRS sequence may use different combs depending on whether the waveform is SC-FDM or OFDM. For example, a DMRS sequence associated with an SC-FDM waveform may use a first set of tones (e.g., even tones), whereas a DMRS sequence associated with OFDM may use a second set of tones (e.g., odd tones).

According to one aspect, a first UE (e.g., the UE 104, the transmitter 404, etc.) may use a first segment 704 associated with the mother sequence 702. Similarly, a second UE may use a second segment 706 associated with the mother sequence 702, and a third UE may use a third segment 708 associated with the mother sequence 702. The reference signal (RS) symbols 710 of a DMRS sequence (e.g., the first segment 704) may be followed by data symbols 712—that is, the RS symbols 710 may be front-loaded in a set of RBs, which may include data symbols 712. In an aspect, each segment 704, 706, 708 may be allocated based on the mother sequence 702 per UE. For example, a first segment 704 may be allocated to a first UE, whereas a different segment 706 corresponding to the mother sequence 702 may be allocated to a different UE.

Figure 8:
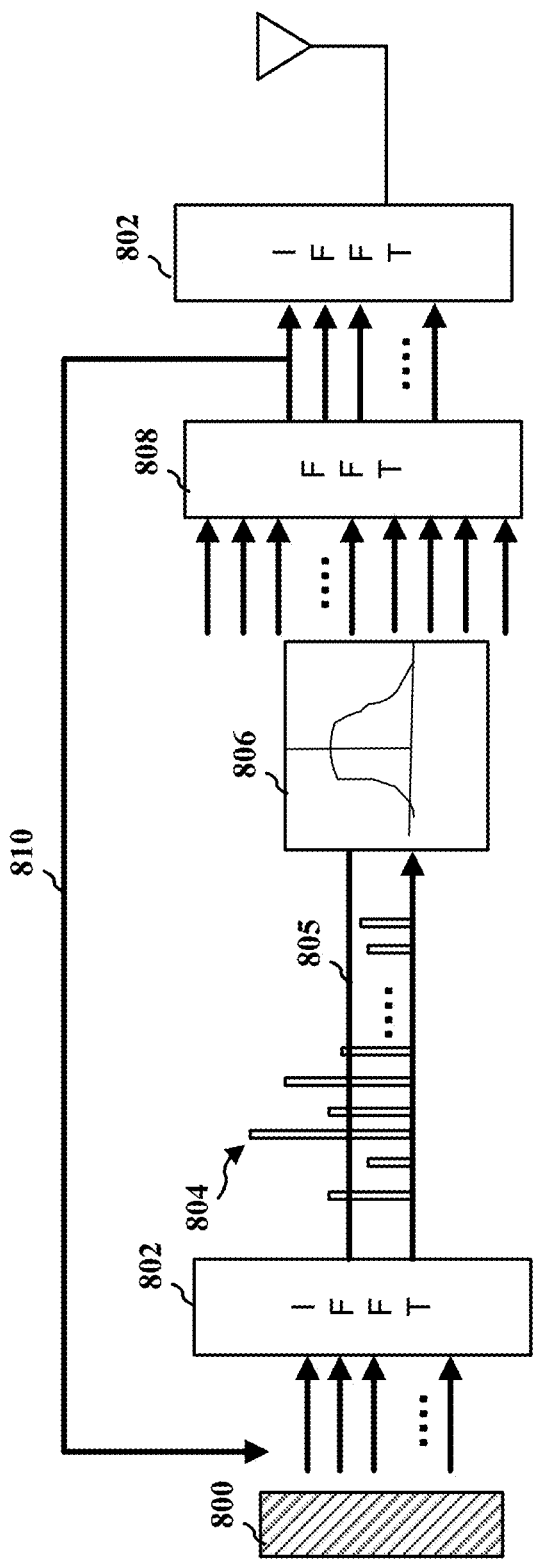
FIG. 8 is a diagram of clipping and filtering to reduce PAPR.

FIG. 8 is a diagram illustrating an approach to reducing PAPR of the DMRS sequence based on clipping and filtering. In various aspects, a sequence 800 (e.g., a segment 704, 706, 708 of the mother sequence 702 or the mother sequence 702) may not have a PAPR that is acceptable for transmission. Therefore, a transmitter (e.g., transmitter 404) may apply clipping 804 and filtering 806 to reduce the PAPR. In an aspect, the sequence 800 may be inapplicable to SC-FDM or the sequence 800 may be length-dependent for SC-FDM so that the sequence 800 is not orthogonal to an OFDM RS.

In an aspect, the sequence 800 may be in the frequency domain. An inverse fast Fourier transform (IFFT) 802 may be applied (e.g., by the transmitter 404) to the sequence 800 to transform the sequence to the time domain. In the time domain, the sequence 800 clipping 804 may be applied (e.g., by the transmitter 404) based on a clipping threshold 805, for example, to remove peaks from the sequence 800. In an aspect, the clipping 804 may be applied (e.g., by the transmitter 404) based on the formula x_i=sign(x_i)*r*p_bar if p_x_i>r*p_bar, where x_i is the sequence 800 (in the time domain), p_bar is the average power, p_x_i is the power of a sample of the sequence 800, and r is the clipping threshold 805.

The clipping 804 may cause leakage to other bands and, therefore, filtering 806 may be applied (e.g., by the transmitter 404). The filtering 806 may include applying a bandpass filter to the clipped sequence 800. A fast Fourier transform 808 may be applied to the clipped and filtered sequence 800 to transform the sequence 800 back to the frequency domain.

The PAPR of the clipped and filtered sequence 800 may then be determined and compared to a threshold (e.g., by the transmitter 404). If the PAPR is below (or meets) the threshold, then an IFFT 802 may again be applied to the sequence 800 so that the sequence 800 may be sent (e.g., in a DMRS as a DMRS sequence). If the PAPR exceeds the threshold, another iteration 810 may be performed of clipping 804 and filtering 806. In various aspects, the threshold 805 may be different for an iteration of clipping 804 and filtering 806 of the sequence 800.

Figure 9:
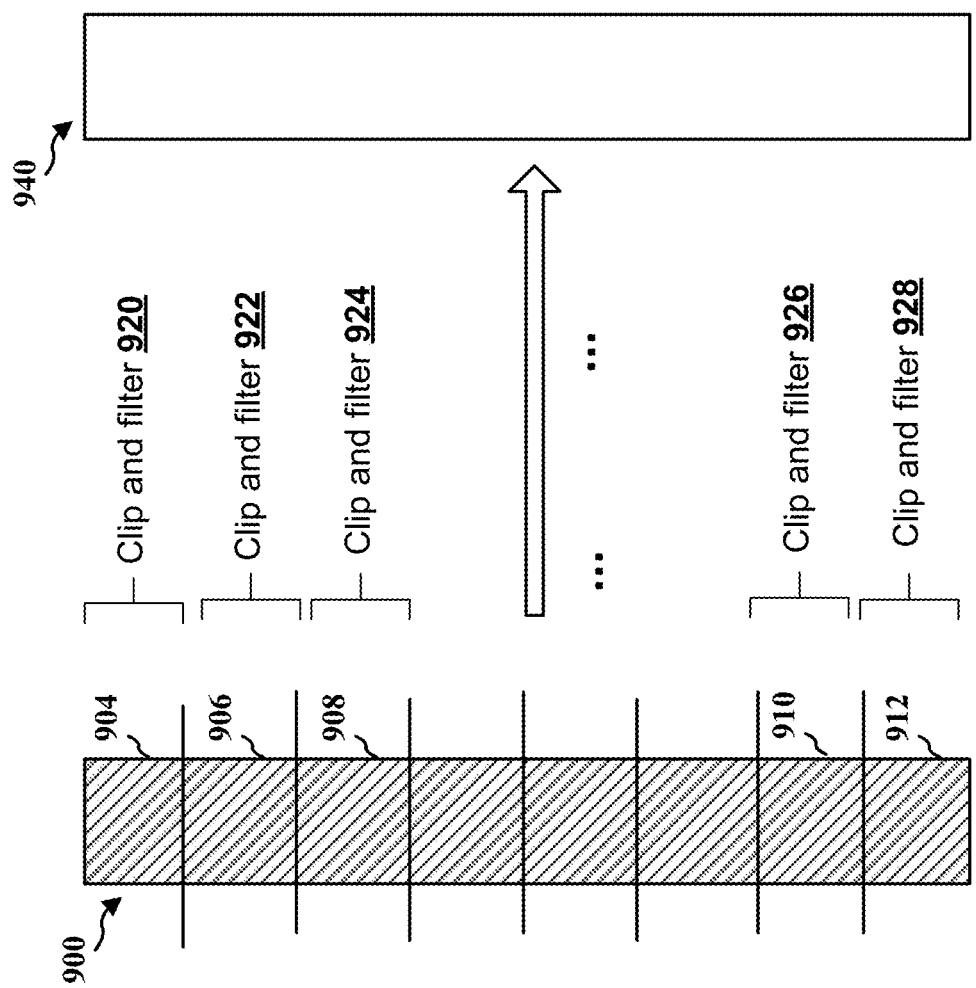
FIG. 9 is a diagram of clipping and filtering to a mother sequence.

FIG. 9 illustrates an approach to clipping and filtering to segments of a mother sequence. In FIG. 9, clipping and filtering is applied (e.g., by the transmitter 404) to reduce PAPR. The clipping and filtering of FIG. 9 may include the approach described in FIG. 8.

As shown, an original mother sequence 900 may be divided into a plurality of segments 904, 906, 908, 910, 912. Each segment 904, 906, 908, 910, 912 may have a length L. For each segment 904, 906, 908, 910, 912, a respective clip and filter 920, 922, 924, 926, 928 is performed (e.g., by the transmitter 404). Each clip and filter 920, 922, 924, 926, 928 may reduce the PAPR for a respective segment 904, 906, 908, 910, 912.

The clip and filter 920, 922, 924, 926, 928 for each segment 904, 906, 908, 910, 912 may generate a new mother sequence 940. However, the frequency domain signals for each segment 904, 906, 908, 910, 912 may be distorted and, therefore, the PAPR of the new mother sequence 940 may increase in comparison to the original mother sequence 900. Accordingly, the clipping threshold (e.g., the threshold 805) may be selected so that the PAPR of the new mother sequence 940 (e.g., a wideband sequence) is within an acceptable range and, further, a respective PAPR of each segment 904, 906, 908, 910, 912 (e.g., a sub-band sequence) having length L is also within an acceptable range (other sub-band sequences with different length(s) other than L may still have a relatively high PAPR).

Figure 10:
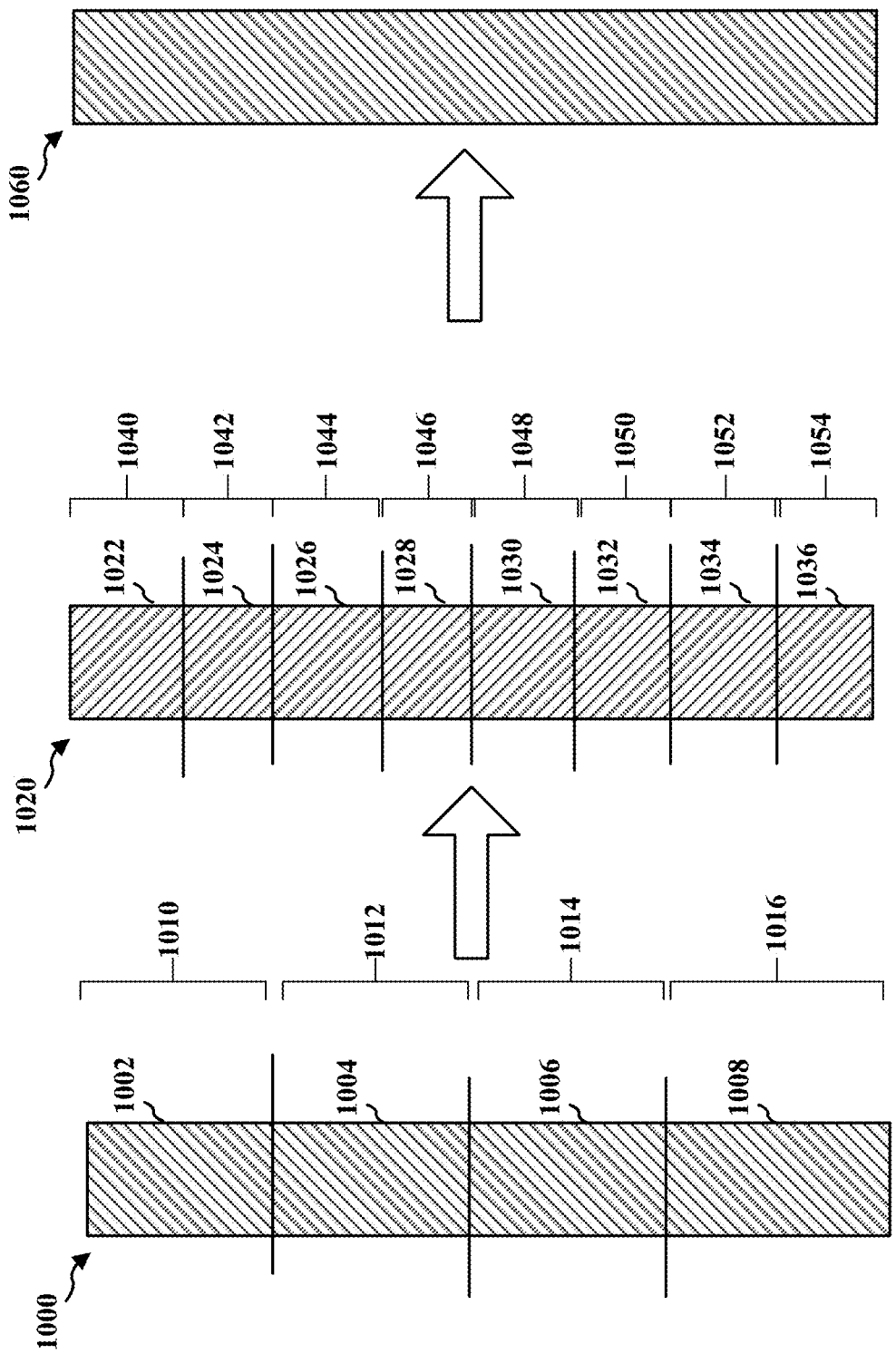
FIG. 10 is a diagram of iterative clipping and filtering to a mother sequence.

FIG. 10 illustrates an approach to clipping and filtering to segments of a mother sequence. In FIG. 10, clipping and filtering is applied to reduce PAPR. The clipping and filtering of FIG. 10 may include the approach described in FIG. 8, including an iteration 810. With respect to FIG. 4, the transmitter 404 may perform clipping and filtering illustrated in FIG. 10.

As shown, an original mother sequence 1000 may be divided into a first set of segments 1002, 1004, 1006, 1008. Each segment 1002, 1004, 1006, 1008 may have a length L (e.g., the first set of segments 1002, 1004, 1006, 1008 may have a length that is one quarter the total length of the original mother sequence 1000). For each segment 1002, 1004, 1006, 1008, a respective clip and filter 1010, 1012, 1014, 1016 is performed. Each clip and filter 1010, 1012, 1014, 1016 may reduce the PAPR for a respective segment 1002, 1004, 1006, 1008 of the first set of segments.

The clip and filter 1010, 1012, 1014, 1016 for each segment 1002, 1004, 1006, 1008 of the first set of segments may generate a first new mother sequence 1020. However, the frequency domain signal for the first new mother sequence 1020 may be distorted and may have an unacceptable PAPR. Therefore, clipping and filtering may be performed iteratively.

The first new mother sequence 1020 may be divided into a second set of segments 1022, 1024, 1026, 1028, 1030, 1032, 1034, 1036. Each segment 1022, 1024, 1026, 1028, 1030, 1032, 1034, 1036 of the second set may have a length R, which may be different than length L (e.g., the second set of segments 1024, 1026, 1028, 1030, 1032, 1034, 1036 may each have a length that is an eighth of the total length of the first new mother sequence 1020).

For each segment 1022, 1024, 1026, 1028, 1030, 1032, 1034, 1036 of the second set, a respective clip and filter 1040, 1042, 1044, 1046, 1048, 1050, 1052, 1054 is performed. Each clip and filter 1040, 1042, 1044, 1046, 1048, 1050, 1052, 1054 may reduce the PAPR for a respective segment 1002, 1004, 1006, 1008 of the first set of segments. As described with respect to FIG. 8, the clipping may be performed according to a threshold 805. However, the threshold for the clip and filter 1040, 1042, 1044, 1046, 1048, 1050, 1052, 1054 of the second set of segments 1022, 1024, 1026, 1028, 1030, 1032, 1034, 1036 may be different than the threshold for the clip and filter 1010, 1012, 1014, 1016 of the first set of segments 1002, 1004, 1006, 1008.

The clip and filter 1040, 1042, 1044, 1046, 1048, 1050, 1052, 1054 for each segment 1022, 1024, 1026, 1028, 1030, 1032, 1034, 1036 of the second set of segments may generate a second new mother sequence 1060. The clip and filter 1040, 1042, 1044, 1046, 1048, 1050, 1052, 1054 for each segment 1022, 1024, 1026, 1028, 1030, 1032, 1034, 1036 of the second set of segments may be offset from the segments 1022, 1024, 1026, 1028, 1030, 1032, 1034, 1036. If the second new mother sequence has an acceptable PAPR (e.g., within a desired range), then the second new mother sequence 1060 may be used.

Although FIG. 10 illustrates two iterations, any number of iterations may be performed. For example, if the PAPR of the second new mother sequence 1060 is not acceptable, then another iteration may be performed. In the third iteration, the second new mother sequence 1060 may be divided into segments that are each one sixteenth of the total length of the second new mother sequence 1060. Further, the threshold used for clipping in the third iteration may be different than the thresholds used for clipping in the first and/or second iterations.

Additional iterations may be performed until a mother sequence with an acceptable PAPR is obtained.

In one aspect, the segments (e.g., the first set of segments 1002, 1004, 1006, 1008 or the second set of segments 1022, 1024, 1026, 1028, 1030, 1032, 1034, 1036) may be used for SC-FDM.

In various aspects, the mother sequence may be defined in one or more technical specifications (TS) that define standards for wireless communication (e.g., a TS promulgated by 3GPP). In one aspect, the mother sequence may be defined by explicitly defining an end mother sequence (e.g., the new mother sequence 1020, the second new mother sequence 1060) in a TS. The end mother sequence may not have a close-form expression. Further, a plurality of different sequences (e.g., 30) may be defined for each possible system bandwidth. Defining the mother sequence by specifying the end sequence in a TS may require relatively large tables.

In another aspect, a TS may define the original mother sequence—i.e., before clipping and filtering iterations (e.g., the original mother sequence 900, the original mother sequence 1000). The original mother sequence may have a close-form expression (e.g., Chu sequence). Further, the TS may specify a number of clipping and filtering iterations or levels in order to obtain the desired new mother sequence for transmission. The TS may additionally define a segment length and a respective threshold for clipping for each iteration or level. Accordingly, both a UE (e.g., the UE 104) and a base station (e.g., the base station 102) may apply clipping and filtering for the defined iterations or levels in order to obtain a same new mother sequence. The UE and base station could perform the one or more iterations or levels offline and store the obtained new mother sequence in memory.

Figure 11:
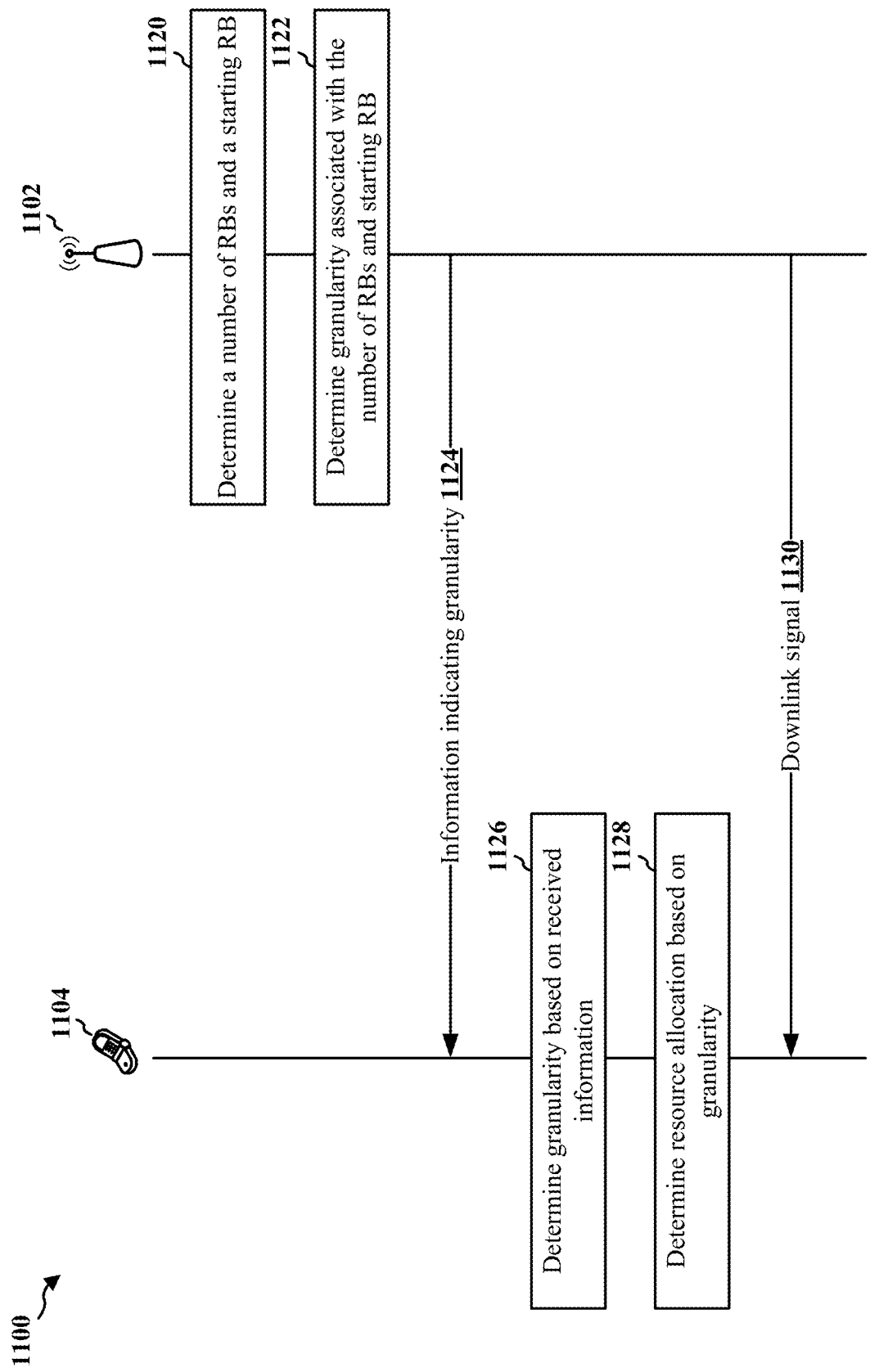
FIG. 11 is a call flow diagram of a method of wireless communication.

FIG. 11 illustrates a call flow diagram of a method 1100 of wireless communication. The method 1100 of wireless communication may include uplink resource allocation with granularity depending upon allocation size. Resource allocation may have any number of RBs starting from any RB. Thus, for a relatively large system bandwidth, a large number of bits in a PDCCH may be used. For example, for a system bandwidth of 25 RBs, 5 bits may be required for a starting RB and 5 bits for the number of RBs. For multi-cluster allocation, allocation and bits may be specified for each cluster.

Different granularities may be used for different allocation sizes. In an aspect, the granularity may be proportional to the determined number of RBs allocated to at least one UE (e.g., the UE 1104). Thus, a smaller granularity may be used for a smaller allocation, whereas a larger granularity may be used for a larger allocation. For example, for a total of 25 RBs, there may be 4 levels of granularity. For an allocation less than or equal to 4, the granularity may be one RB, starting from any N RB (e.g., N=0, 1, . . . ). For an allocation inclusively between 5 and 8, the granularity may be 2 RBs, starting from 2*N RB. For an allocation inclusively between 9 and 16, the granularity may be 4 RBs, starting from 4*N RB. Similarly, for an allocation inclusively between 17 and 25, the granularity may be 8 RBs, starting from 8*N RB.

The granularity based on allocation size may require less number of bits for allocation. For example, if the number of RBs is relatively small, more bits may be used to specify a starting RB, but less bits may be used to specify a number of RBs for allocation. If the number of RBs for allocation is relatively large, less bits may be used to specify a starting RB but more bits may be used to specify the number of RBs for allocation. For example, for an allocation having a granularity of one RB, 5 bits may be used to indicate the starting RB and 2 bits may be used to specify the number of RBs. For an allocation having a granularity of two RBs, 4 bits may be used to indicate the starting RB and 2 bits may be used to specify the number of RBs. For an allocation having a granularity of four RBs, 3 bits may be used to indicate the starting RB and 3 bits may be used to specify the number of RBs. For an allocation having a granularity of 8 RBs, 2 bits may be used to indicate the starting RB and 4 bits may be used to specify the number of RBs.

In aspects, 2 bits may be required to indicate the granularity level, which may total a maximum of 9 bits (e.g., 5 bits to indicate starting RB, 2 bits to indicate the number of RBs, and 2 bits to indicate granularity, which is less than 10 bits required in existing approaches). The number of bits may be further reduced if the possible allocations are reduced. For example, For example, for an allocation size=2^N (1, 2, 4, 8, 16, 25), starting from every 2^N(1, 2, 4, 8, 16, 25) boundary, then 3 bits may be used for 5 levels, and 5 bits for starting RBs, which totals 8 bits.

In an aspect, the base station 1102 may determine 1120 a number of RB s and a starting RB. For example, the base station 1102 may determine allocation information associated with the UE 1104. Further, the base station 1102 may determine 1122 a granularity associated with the number of RBs and the starting RBs. In aspects, the base station 1102 may determine the granularity based on the allocation size (e.g., the number of RBs allocated to the UE 1104). The base station 1102 may determine the granularity as proportional to the number of RBs allocated (e.g., a larger granularity may be commensurate with a larger allocation size). In one aspect, the allocation size and the granularity may be cell-specific. The base station 1102 may determine a combination of allocation size and granularity and assign that combination to the UE 1104.

The base station 1102 may send, to the UE 1104, information 1124 indicating the granularity. In an aspect, the information 1124 may be indicated using 2 bits. In an aspect, the information 1124 may include an index associated with granularity. In an aspect, the information 1124 may be carried on a PDCCH.

The base station 1102 may further send, to the UE 1104, information indicating the starting RB (e.g., indicated using 5 bits) and information indicating a number of RBs (e.g., indicated using 2 bits). This information may be carried on a PDCCH.

The UE 1104 may receive the information 1124 indicating the granularity and the information indicating the starting RB and the number of RBs. The UE 1104 may determine 1126 the granularity based on the information 1124 indicating the granularity. For example, if the information 1124 indicating the granularity includes an index, the UE 1104 may reference a TS (e.g., 3GPP TS) in order to determine a granularity level that corresponds to the index.

The UE 1104 may then determine 1128 the resource allocation for the UE 1104 based on the granularity, the starting RB, and the number of RBs. The UE 1104 may then receive, from the base station 1102, a downlink signal 1130. The UE 1104 may detect the downlink signal based on the resource allocation that is determined from the granularity, the starting RB, and the number of RBs.

In an aspect, a base station 1102 may receive at least one of an allocation size or a granularity from a neighbor cell. The base station 1102 may send an indication of at least one of the allocation size or the granularity to a UE 1104. When operating on a cell provided by the base station 1102, the UE 1104 may perform blind interference estimation and, if necessary, cancellation when experiencing mixed interference (e.g., when two cells have different downlink and uplink configurations). For mixed interference, the UE 1104 may receive all possible combinations of a neighbor cell and try every hypothesis for blind interference cancellation, since the UE does not know the specific allocated combination to the specific interfering UE.

When the UE 1104 is proximate to a cell edge and in a downlink reception mode, the UE 1104 may receive interference from another UE in an uplink transmission mode in a different cell. However, the UE 1104 may perform interference estimation and cancellation using the allocation size and granularity information from the neighboring cell. The at least one of the allocation size or the granularity may decrease complexity for interference estimation and cancellation because the total number of hypotheses may be smaller than if the granularity were absent.

Figure 12:
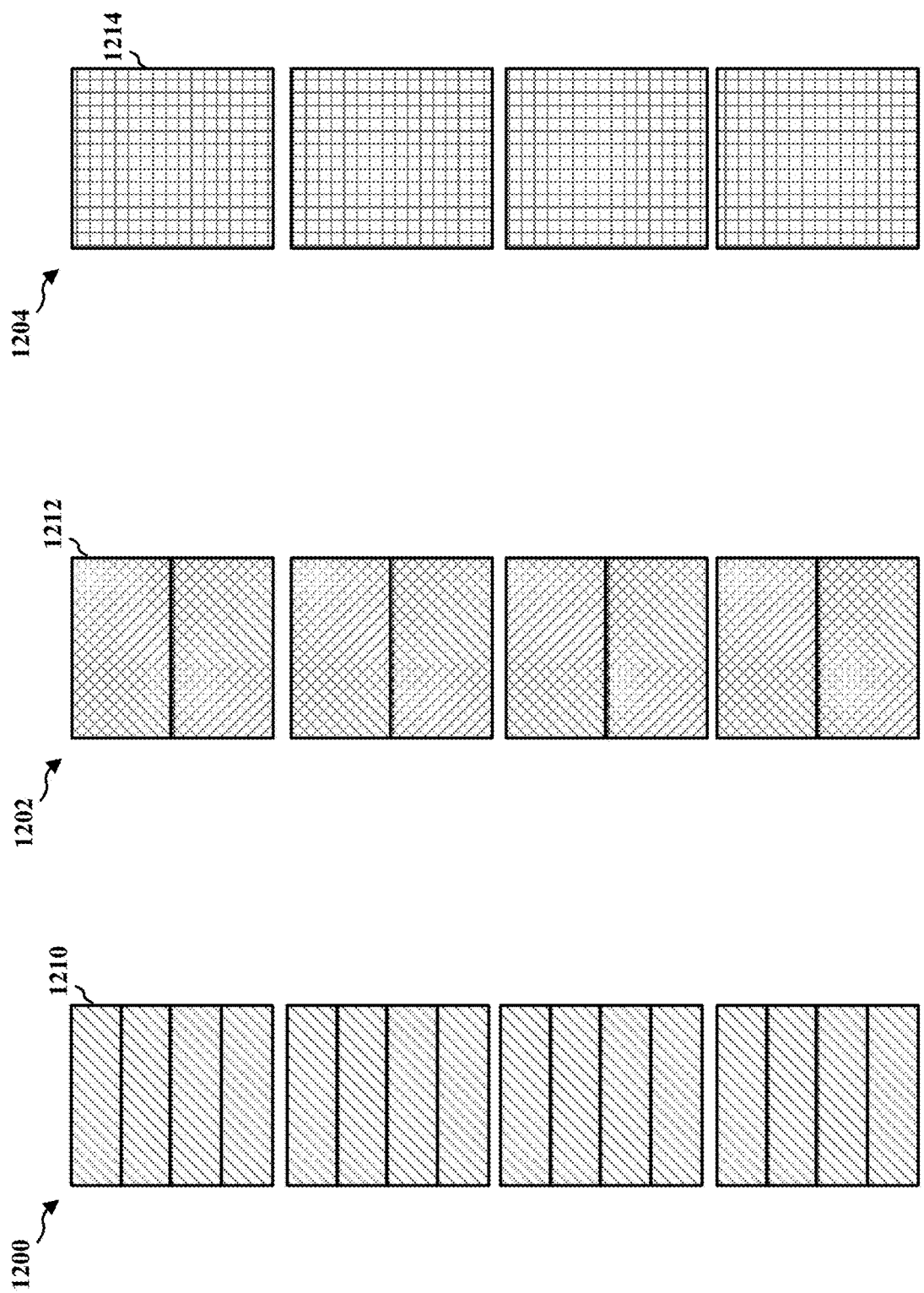
FIG. 12 is a diagram of granularity based on allocation.

In the illustrated aspect of FIG. 12, different granularities may be used for different allocation sizes. In an aspect, the granularity may be proportional to the determined number of resource blocks allocated to at least one UE 1104. Thus, a smaller granularity may be used for a smaller allocation, whereas a larger granularity may be used for a larger allocation. For example, for a total of 25 RBs, there may be 4 levels of granularity. For an allocation 1200 less than or equal to 4, the granularity may be one RB 1210, starting from any N RB (e.g., N=0, 1, . . . ). For an allocation 1202 inclusively between 5 and 8, the granularity may be 2 RBs 1212, starting from 2*N RB. For an allocation 1204 inclusively between 9 and 16, granularity may be 4 RBs 1214, starting from 4*N RB. Similarly, for an allocation inclusively between 17 and 25, the granularity may be 8 RBs, starting from 8*N RB.

The granularity based on allocation size may require less number of bits for allocation. For example, if the number of RBs is relatively small, more bits may be used to specify a starting RB, but less bits may be used to specify a number of RBs for allocation. If the number of RBs for allocation is relatively large, less bits may be used to specify a starting RB but more bits may be used to specify the number of RBs for allocation. For example, for an allocation 1200 having a granularity of one RB 1210, 5 bits may be used to indicate the starting RB and 2 bits may be used to specify the number of RBs. For an allocation 1202 having a granularity of two RBs 1212, 4 bits may be used to indicate the starting RB and 2 bits may be used to specify the number of RBs. For an allocation 1204 having a granularity of four RBs 1214, 3 bits may be used to indicate the starting RB and 3 bits may be used to specify the number of RBs. For an allocation having a granularity of 8 RBs, 2 bits may be used to indicate the starting RB and 4 bits may be used to specify the number of RBs.

Figure 13:
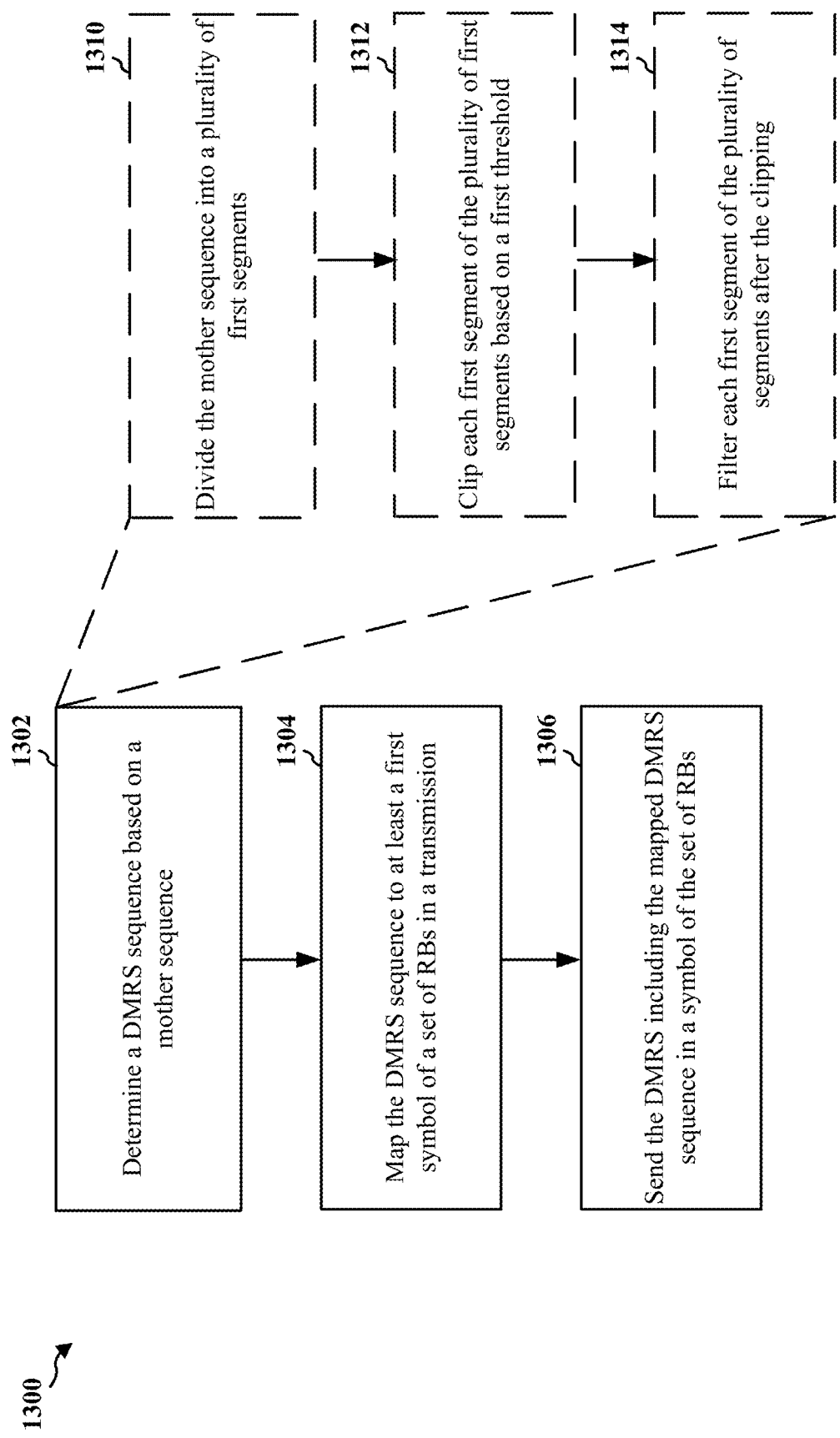
FIG. 13 is a flowchart of a method of wireless communication.

FIG. 13 is a flowchart of a method 1300 of wireless communication. The method 1300 may be performed by an apparatus, a transmitter (e.g., the transmitter 404), a UE (e.g., the UE 102), a base station (e.g., the base station 104), or another wireless communications system. One of ordinary skill would understand that one or more operations may be omitted, transposed, and or performed contemporaneously.

At operation 1302, the apparatus may determine a DMRS sequence based on a mother sequence. In the context of FIG. 4, the transmitter 404 may determine a DMRS sequence based on a mother sequence. In one aspect, the mother sequence may be the mother sequence 702.

In one aspect, operation 1302 may include operations 1310, 1312, 1314. In an aspect, operations 1310, 1312, 1314 may be described in one or more of FIGS. 8, 9, 10. At operation 1310, the apparatus may divide the mother sequence into a plurality of first segments. In the context of FIG. 4, the transmitter 404 may divide the mother sequence into a plurality of first segments (e.g., the first segments 904, 906, 908, 910, 912).

At operation 1312, the apparatus may clip each first segment of the plurality of first segments based on a first threshold. In the context of FIG. 4, the transmitter 404 may clip each first segment of the plurality of first segments based on a first threshold. For example, the apparatus may apply clipping 804 based on the threshold 805.

At operation 1314, the apparatus may filter each first segment of the plurality of first segments after clipping. In the context of FIG. 4, the transmitter 404 may filter each first segment of the plurality of first segments after the clipping. For example, the apparatus may apply filtering 806 after the clipping 804. In an aspect, the segment may be used as a DMRS sequence or may be part of a new mother sequence.

At operation 1304, the apparatus may map the DMRS sequence to at least a first symbol of a set of RBs in a transmission. In an aspect, the first symbol may occur at a beginning of the transmission. In the context of FIG. 4, the transmitter 404 may map the DMRS sequence to at least a first symbol of a set of RBs in a transmission. For example, the transmitter 404 may be a base station and may map the DMRS sequence 604 to at least a first symbol of the DL PDSCH 606. In another example, the transmitter 404 may be a UE and may map the DMRS sequence 506 to at least a first symbol of the UL regular burst 508.

At operation 1306, the apparatus may send the DMRS including the mapped DMRS sequence in the first symbols of the set of RBs. In the context of FIG. 4, the transmitter 404 may send a transmission 426 that includes the DMRS having the mapped DMRS sequence in the first symbols of the set of RBs. For example, the transmitter 404 may be a base station and may transmit the downlink DMRS sequence 604. In another example, the transmitter 404 may be a UE and may transmit the uplink DMRS sequence 506.

Figure 14:
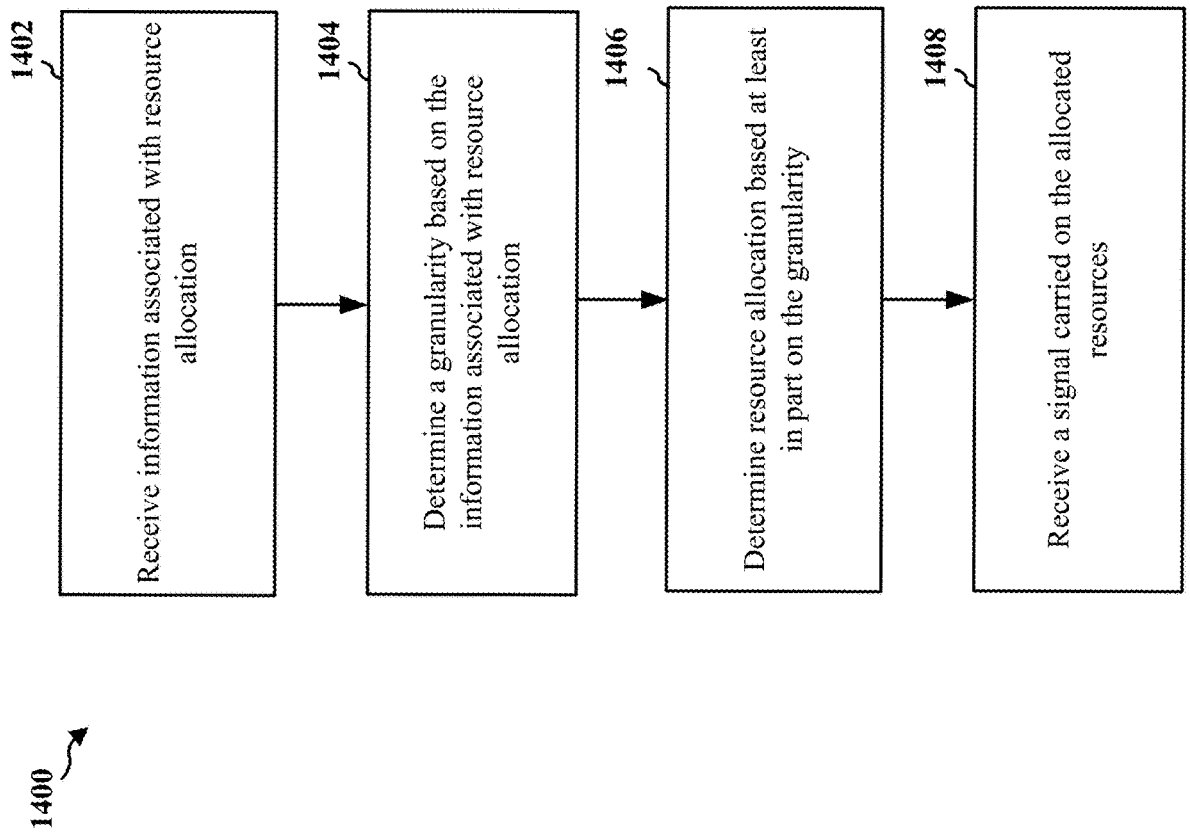
FIG. 14 is a flowchart of a method of wireless communication.

FIG. 14 is a flowchart of a method 1400 of wireless communication. The method 1400 may be performed by an apparatus, such as a UE (e.g., the UE 104, the UE 1104, etc.), or another wireless communications system. One of ordinary skill would understand that one or more operations may be omitted, transposed, and or performed contemporaneously.

At operation 1402, the UE may receive information associated with resource allocation from a base station. In an aspect, the resource allocation information may indicate a starting RB and a number of RBs. In an aspect, the resource allocation information may indicate a granularity (e.g., a granularity index). The resource allocation information may be received on a PDCCH. In the context of FIG. 11, the UE 1104 may receive information associated with resource allocation, which include the information 1124 indicating granularity.

At operation 1404, the UE may determine a granularity based on the received information associated with the resource allocation. For example, the UE may identify a granularity index included in the resource allocation information, and the UE may reference stored data (e.g., a lookup table) in order to determine a granularity that corresponds to the granularity index. In the context of FIG. 11, the UE 1104 may determine 1126 the granularity based on the information 1124 associated with the granularity.

At operation 1406, the UE may determine a resource allocation based at least in part on the granularity. For example, the UE may determine one or more resources to monitor at the determined granularity, beginning with a starting RB indicated to the UE in the received resource allocation information. The UE may then monitor the number of RBs at the determined granularity beginning with the starting RB. In the context of FIG. 11, the UE 1104 may determine 1128 the resource allocation for the UE 1104 based on the determined granularity.

At operation 1408, the UE may receive a signal carried on the allocated resources. For example, the UE may receive a downlink transmission and detect a signal intended for the UE carried on the determined resources at the determined granularity. In the context of FIG. 11, the UE 1104 may receive the downlink signal 1130 on resources allocated to the UE 1104.

Figure 15:
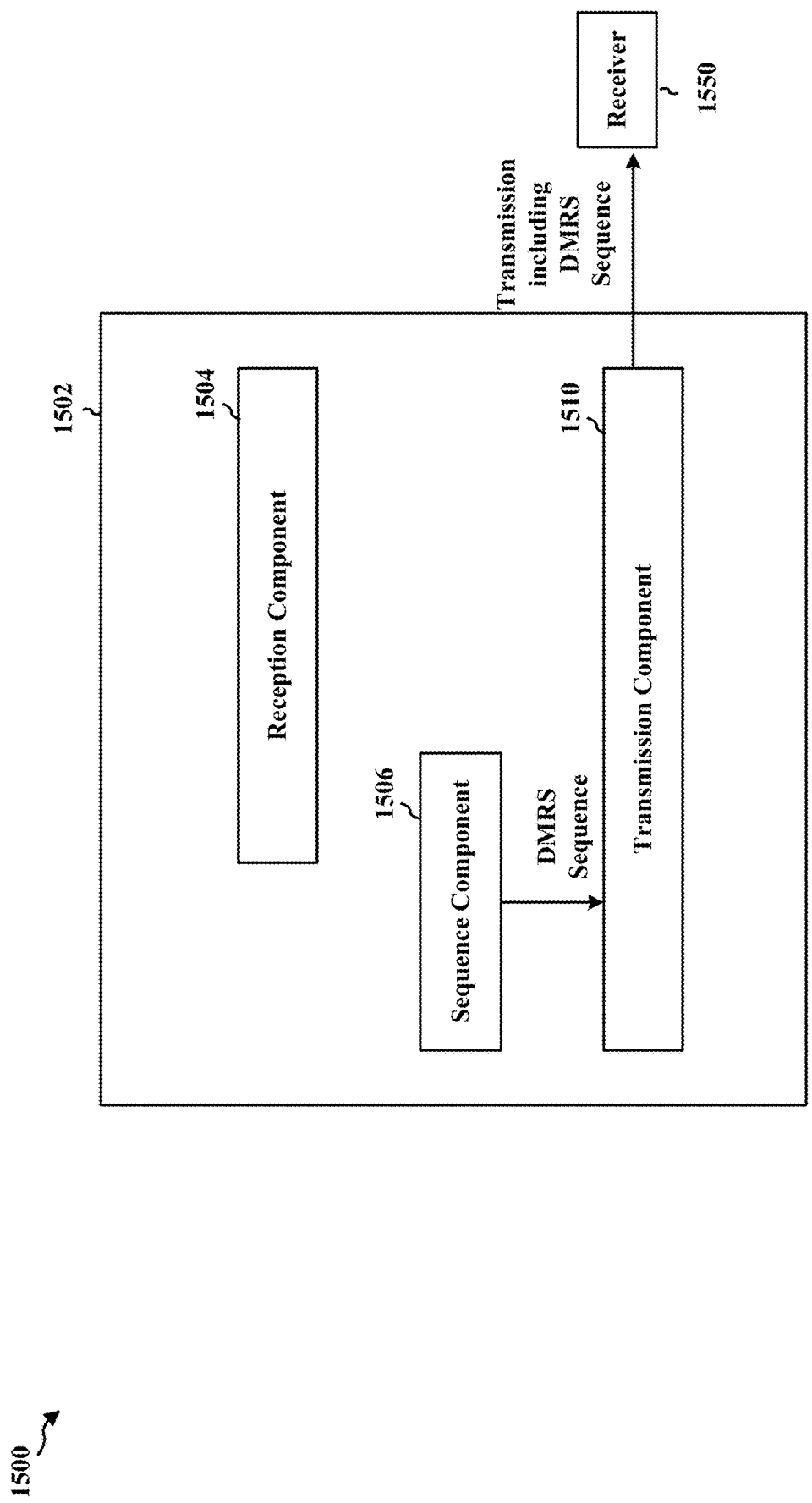
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a UE or a base station. The apparatus includes a reception component 1504 that is configured to receive signals. The apparatus 1502 includes a transmission component 1510 that is configured to transmit signals (e.g., to the receiver 1550).

The apparatus 1502 may include a sequence component 1506. In aspects, the sequence component 1506 may determine a DMRS sequence based on a mother sequence. The sequence component 1506 may map the DMRS sequence to at least one symbol, e.g., a first symbol of a set of RBs in a transmission. The first symbol occurs at a beginning of the transmission (e.g., subframe or burst). In an aspect, the DMRS sequence is mapped to a subset of evenly downsampled subcarriers, e.g., every other subcarrier, in the DMRS symbol, e.g., the first symbol in a comb structure. In an aspect, the DMRS sequence is mapped to a first set of every other subcarrier in a comb structure for a downlink DMRS, and wherein the DMRS sequence is mapped to a different set of every other subcarrier in a comb structure for an uplink DMRS. In an aspect, the DMRS sequence is mapped to a first set of every other subcarrier in a comb structure in an uplink DMRS for SC-FDM, and the DMRS sequence is mapped to a different set of every other subcarrier in a comb structure in an uplink DMRS for OFDM. In an aspect, the DMRS sequence is based on a first shift of the mother sequence for a downlink DMRS, and wherein the DMRS sequence is based on a second shift of the mother sequence for an uplink DMRS (e.g., the second shift may be the same or different from the first shift). In an aspect, the first and second shifts may be different. In an aspect, the first and second shifts may be the same. In an aspect, the DMRS sequence is based on a segment of the mother sequence, and wherein the segment is based on allocated RBs.

The sequence component 1506 may determine the DMRS sequence based on the mother sequence by dividing the mother sequence into a plurality of first segments, clipping each first segment of the plurality of first segments based on a first threshold, and filtering each first segment of the plurality of segments after the clipping to form each second segment of a plurality of second segments. In an aspect, the sequence component 1506 may further determine the DMRS sequence based on the mother sequence by clipping each second segment based on a second threshold and filtering each second segment after the clipping each second segment. In an aspect, a respective PAPR associated with each first segment is equal to or less than a PAPR threshold.

The apparatus may include additional components that perform each of the blocks of the algorithm in the aforementioned flowcharts of FIGS. 4 and 13. As such, each block in the aforementioned flowcharts of FIGS. 4 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
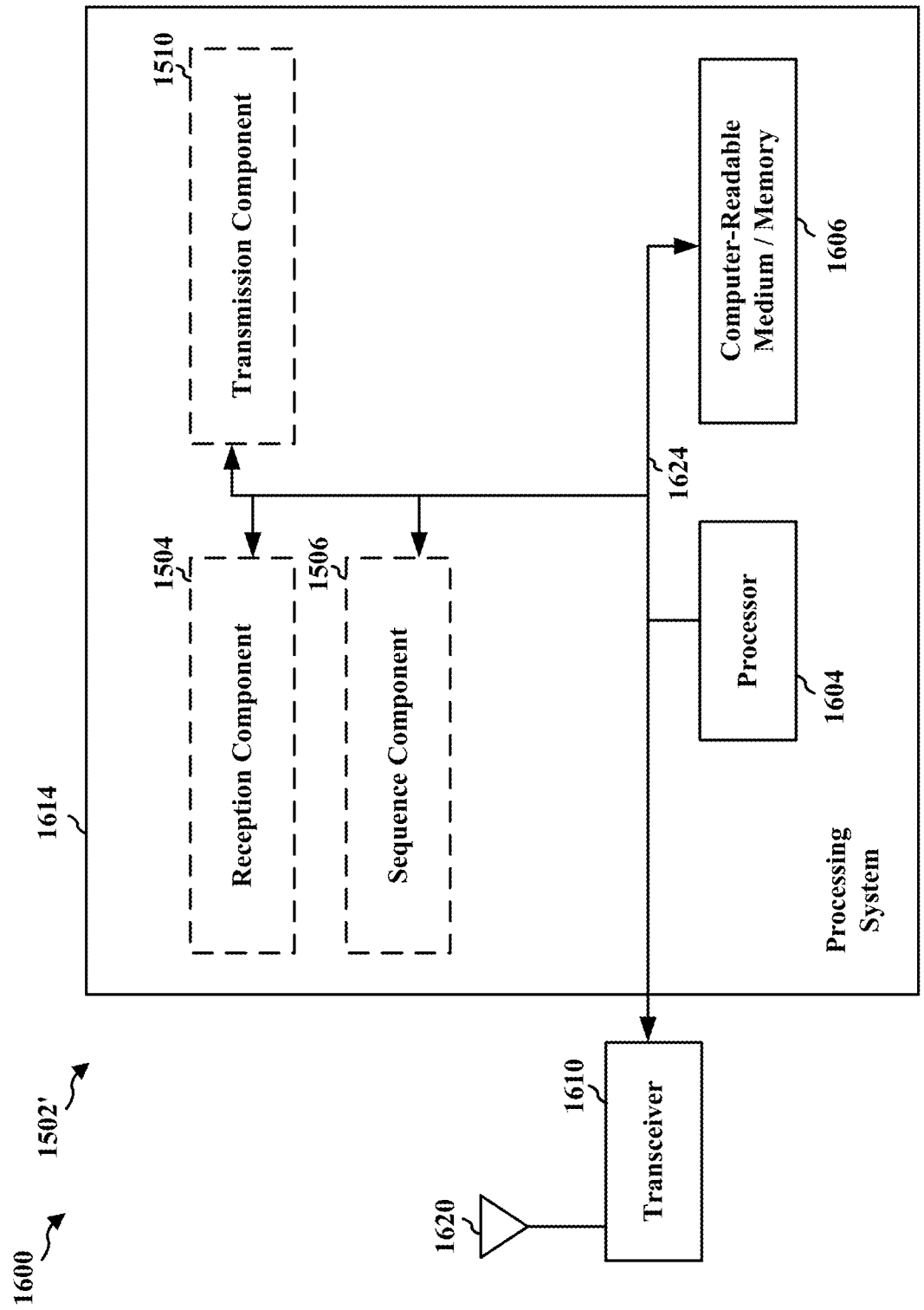
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1510, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1510. The components may be software components running in the processor 1604, resident/stored in the computer readable medium/memory 1606, one or more hardware components coupled to the processor 1604, or some combination thereof. If the apparatus 1502 is a base station, the processing system 1614 may be a component of the base station 310 and may include the memory 376 and/or at least one of the TX processor 316, the RX processor 370, and the controller/processor 375. If the apparatus 1502 is a UE, the processing system 1614 may be a component of the UE 350 and may include the memory 360 and/or at least one of the TX processor 368, the RX processor 356, and the controller/processor 359.

In one configuration, the apparatus 1502/1502' for wireless communication includes means for determining a DMRS sequence based on a mother sequence, means for mapping the DMRS sequence to at least a first symbol of a set of RBs in a transmission. In an aspect, the first symbol may occur at a beginning of the transmission. The apparatus 1502/1502' may include means for sending a DMRS including the mapped DMRS sequence in the first symbol of the set of RBs. In an aspect, the DMRS sequence is mapped to subcarriers in the first symbol in a comb structure. In an aspect, the DMRS sequence is mapped to a first set of subcarriers in a comb structure for a downlink DMRS, and wherein the DMRS sequence is mapped to a different set of subcarriers in a comb structure for an uplink DMRS. In an aspect, the DMRS sequence is mapped to a first set of subcarriers in a comb structure in an uplink DMRS for SC-FDM, and wherein the DMRS sequence is mapped to a different set of subcarriers in a comb structure in an uplink DMRS for OFDM. In an aspect, the DMRS sequence is based on a first shift of the mother sequence for a downlink DMRS, and wherein the DMRS sequence is based on a second shift of the mother sequence for an uplink DMRS. In an aspect the first shift may be equivalent to the first shift or the second shift may be different from the first shift. In an aspect, the DMRS sequence is based on a segment of the mother sequence, and wherein the segment is based on allocated RBs. In an aspect, the means for determining the DMRS sequence based on the mother sequence is configured for dividing the mother sequence into a plurality of first segments, clipping each first segment of the plurality of first segments based on a first threshold, and filtering each first segment of the plurality of segments after the clipping to form each second segment of a plurality of second segments. In an aspect, the means for determining the DMRS sequence based on the mother sequence is configured for clipping each second segment based on a second threshold, and filtering each second segment after the clipping each second segment. In an aspect, a respective PAPR associated with each first segment is equal to or less than a PAPR threshold.

The aforementioned means may be one or more of the aforementioned components of the apparatus 1502 and/or the processing system 1614 of the apparatus 1502' configured to perform the functions recited by the aforementioned means. When the apparatus 1502/1502' is a base station, as described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

When the apparatus 1502/1502' is a UE, as described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
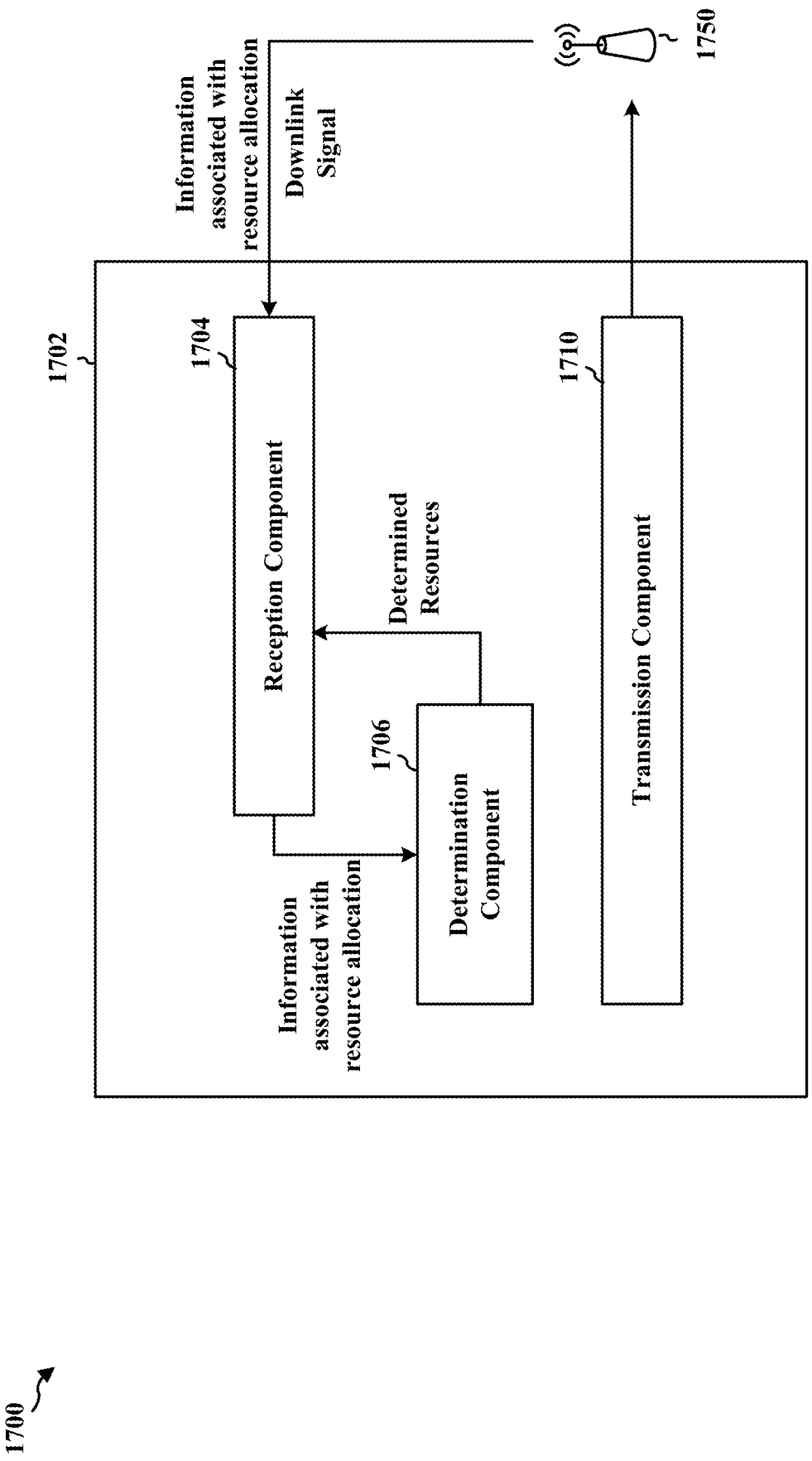
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a UE. The apparatus 1702 includes a reception component 1704 that is configured to receive signals (e.g., from the base station 1750). The apparatus 1702 includes a transmission component configured to transmit signals (e.g., to the base station 1750).

In aspects, the reception component 1704 may receive information associated with resource allocation and provide such information to a determination component 1706. The determination component 1706 may determine a granularity based on the information associated with resource allocation. For example, the received information may include an index, and the determination component 1706 may access stored data to identify a value that corresponds to the index (e.g., the value may correspond to the granularity). The determination component 1706 may determine resource allocation based at least in part on the granularity. For example, the received information may additionally include a starting RB (e.g., a starting RB index) and a number of RBs allocated to the apparatus 1702. In an aspect, the granularity is proportional to the number of RBs allocated to the UE by the resource allocation. The granularity may be a number of RBs (e.g., 1, 2, 4, or 8). The determination component 1706 may determine that the resource allocation corresponds to the starting RB at the determined granularity for the number of RBs.

The determination component 1706 may indicate, to the reception component 1704, the resources determined to be allocated to the apparatus 1702. The reception component 1704 may monitor those resources. The reception component 1704 may receive a signal carried on resources corresponding to the resource allocation.

In an aspect, the reception component 1704 may receive at least one of an indication of an allocation size or a granularity associated with a neighboring cell for blind interference estimation associated with mixed interference. The reception component 1704 may perform interference cancellation based on the received indication.

The apparatus may include additional components that perform each of the blocks of the algorithm in the aforementioned flowcharts of FIGS. 11 and 14. As such, each block in the aforementioned flowcharts of FIGS. 11 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
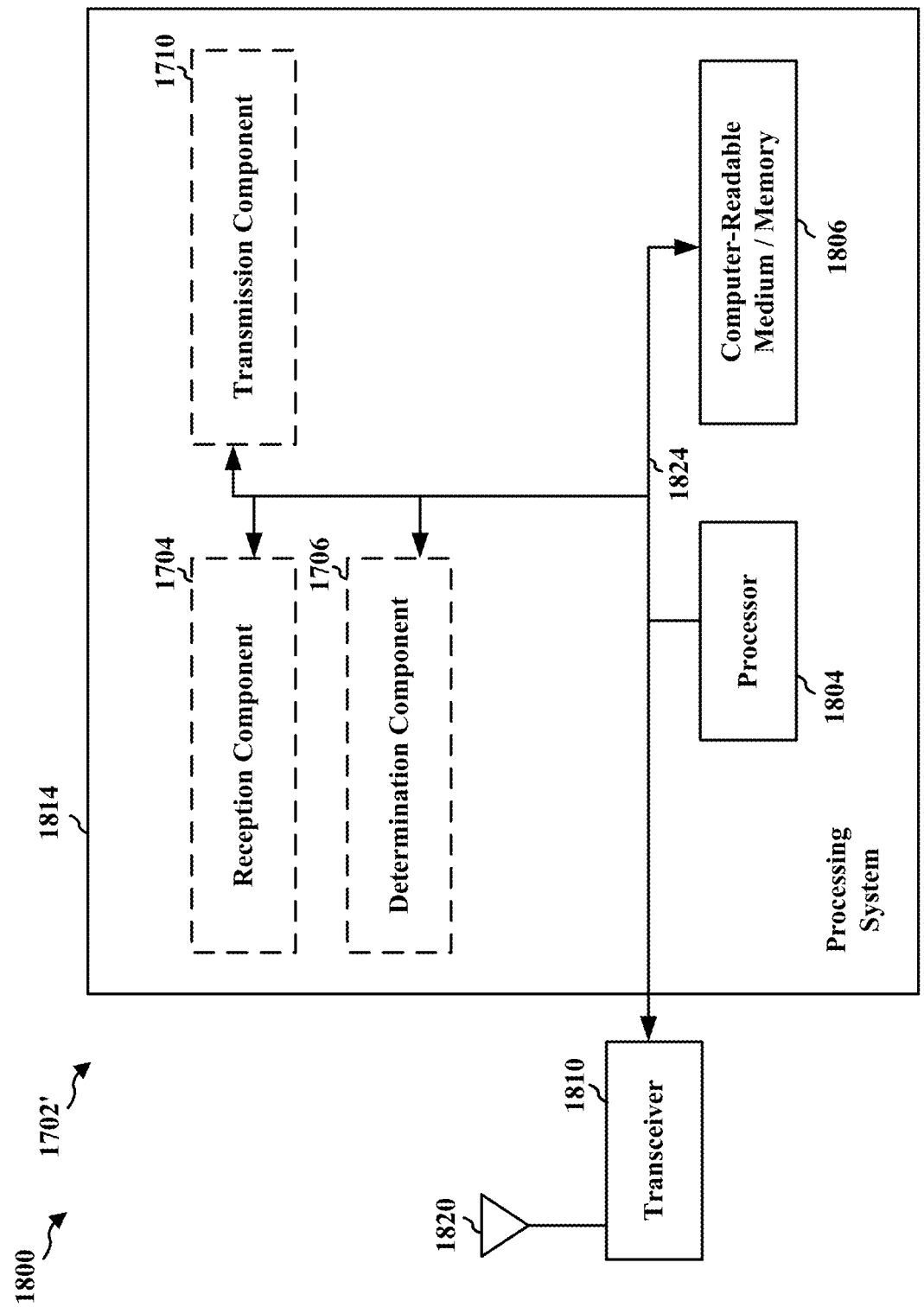
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1710, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1710, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1710. The components may be software components running in the processor 1804, resident/stored in the computer readable medium/memory 1806, one or more hardware components coupled to the processor 1804, or some combination thereof. The processing system 1814 may be a component of the UE 350 and may include the memory 360 and/or at least one of the TX processor 368, the RX processor 356, and the controller/processor 359.

In one configuration, the apparatus 1702/1702' for wireless communication includes means for receiving information associated with resource allocation, means for determining a granularity based on the information associated with resource allocation, means for determining resource allocation based at least in part on the granularity, and means for receiving a signal carried on resources corresponding to the resource allocation. In an aspect, the granularity is proportional to the number of RBs allocated to the UE by the resource allocation. In an aspect, the information associated with the resource allocation includes one or more of a starting RB, a number of RBs, or a granularity index. In an aspect, the granularity corresponds to a number of RBs. In an aspect, the number of RBs is one, two, four, or eight. The apparatus 1702/1702' may further include means for receiving at least one of an indication of an allocation size or a granularity associated with a neighboring cell for blind interference estimation associated with mixed interference.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, the method comprising:
 determining a demodulation reference signal (DMRS) sequence based on a mother sequence;
 mapping the DMRS sequence to at least one symbol of a set of resource blocks (RBs) in a transmission; and
 sending a DMRS including the mapped DMRS sequence in the at least one symbol of the set of RBs;
 wherein the DMRS sequence is based on a first shift of the mother sequence for a downlink DMRS, and wherein the DMRS sequence is based on a second shift of the mother sequence for an uplink DMRS.

2. The method of claim 1, wherein the DMRS sequence is mapped to subcarriers in a first symbol in a comb structure.

3. The method of claim 2, wherein the DMRS sequence is mapped to a first set of subcarriers in a comb structure for a downlink DMRS, and wherein the DMRS sequence is mapped to a different set of subcarriers in a comb structure for an uplink DMRS.

4. The method of claim 2, wherein the DMRS sequence is mapped to a first set of subcarriers in a comb structure in an uplink DMRS for single-carrier frequency division multiplexing (SC-FDM), and wherein the DMRS sequence is mapped to a different set of subcarriers in a comb structure in an uplink DMRS for orthogonal frequency-division multiplexing (OFDM).

5. The method of claim 1, wherein the DMRS sequence is based on a segment of the mother sequence, and wherein the segment is based on allocated RBs.

6. The method of claim 1, wherein the determining the DMRS sequence based on the mother sequence comprises:
 dividing the mother sequence into a plurality of first segments;
 clipping each first segment of the plurality of first segments based on a first threshold; and
 filtering each first segment of the plurality of first segments after the clipping to form each second segment of a plurality of second segments.

7. The method of claim 6, wherein the determining the DMRS sequence based on the mother sequence further comprises:
 clipping each second segment based on a second threshold; and
 filtering each second segment after the clipping each second segment.

8. The method of claim 6, wherein a respective peak-to-average-power ratio (PAPR) associated with each first segment is equal to or less than a PAPR threshold.

9. The method of claim 1, herein the at least one symbol of the set of RBs is a first symbol of the transmission..

10. The method of claim 1, wherein the transmission is one of an uplink transmission or a downlink transmission.

11. The method of claim 1, wherein the second shift is equivalent to the first shift or the second shift is different from the first shift.

12. An apparatus for wireless communication, the apparatus comprising:
 a memory; and
 at least one processor coupled to the memory and configured to:
  determine a demodulation reference signal (DMRS) sequence based on a mother sequence;
  map the DMRS sequence to at least one symbol of a set of resource blocks (RBs) in a transmission; and
  send a DMRS including the mapped DMRS sequence in the at least one symbol of the set of RBs;
 wherein the DMRS sequence is based on a first shift of the mother sequence for a downlink DMRS, and wherein the DMRS sequence is based on a second shift of the mother sequence for an uplink DMRS.

13. The apparatus of claim 12, wherein the DMRS sequence is mapped to subcarriers in a first symbol in a comb structure.

14. The apparatus of claim 13, wherein the DMRS sequence is mapped to a first set of subcarriers in a comb structure for a downlink DMRS, and wherein the DMRS sequence is mapped to a different set of subcarriers in a comb structure for an uplink DMRS.

15. The apparatus of claim 13, wherein the DMRS sequence is mapped to a first set of subcarriers in a comb structure in an uplink DMRS for single-carrier frequency division multiplexing (SC-FDM), and wherein the DMRS sequence is mapped to a different set of subcarriers in a comb structure in an uplink DMRS for orthogonal frequency-division multiplexing (OFDM).

16. The apparatus of claim 12, wherein the DMRS sequence is based on a segment of the mother sequence, and wherein the segment is based on allocated RBs.

17. The apparatus of claim 12, wherein the determination of the DMRS sequence based on the mother sequence comprises to:
 divide the mother sequence into a plurality of first segments;
 clip each first segment of the plurality of first segments based on a first threshold; and
 filter each first segment of the plurality of first segments after the clipping to form each second segment of a plurality of second segments.

18. The apparatus of claim 12 wherein the second shift is equivalent to the first shift or the second shift is different from the first shift.

19. An apparatus for wireless communication, the apparatus comprising:
 means for determining a demodulation reference signal (DMRS sequence based on a mother sequence:
 means for mapping the DMRS sequence to at least one symbol of a set of resource blocks (RBs) in a transmission; and
 means for sending a DMRS including the mapped DMRS sequence in the at least one symbol of the set of RBs;
 wherein the DMRS sequence is based on a first shift of the mother sequence for a downlink DMRS, and wherein the DMRS sequence is based on a second shift of the mother sequence for an uplink DMRS.

20. The apparatus of claim 19, wherein the DMRS sequence is mapped to subcarriers in a first symbol in a comb structure.

21. The apparatus of claim 20, wherein the DMRS sequence is mapped to a first set of subcarriers in a comb structure for a downlink DMRS, and wherein the DMRS sequence is mapped to a different set of subcarriers in a comb structure for an uplink DMRS.

22. The apparatus of claim 20, wherein the DMRS sequence is mapped to a first set of subcarriers in a comb structure in an uplink DMRS for single-carrier frequency division multiplexing (SC-FDM), and wherein the DMRS sequence is mapped to a different set of subcarriers in a comb structure in an uplink DMRS for orthogonal frequency-division multiplexing (OFDM).

23. The apparatus of claim 19, wherein the DMRS sequence is based on a segment of the mother sequence, and wherein the segment is based on allocated RBs.

24. The apparatus of claim 19, wherein the means for determining the DMRS sequence based on the mother sequence is configured to:
 divide the mother sequence into a plurality of first segments;
 clip each first segment of the plurality of first segments based on a first threshold; and
 filter each first segment of the plurality of first segments after the clipping to form each second segment of a plurality of second segments.

25. The apparatus of claim 24, wherein the means for determining the DMRS sequence based on the mother sequence further is further configured to:
 clip each second segment based on a second threshold; and
 filter each second segment after the clipping each second segment.

26. The apparatus of claim 24, wherein a respective peak-to-average-power ratio (PAPR) associated with each first segment is equal to or less than a PAPR threshold.

27. The apparatus of claim 19, wherein the at least one symbol of the set of RBs is a first symbol of the transmission.

28. The apparatus of claim 19, wherein the transmission is one of an uplink transmission or a downlink transmission.

29. The apparatus of claim 19, wherein the second shift is equivalent to the first shift or the second shift is different from the first shift.

30. A non-transitory, computer-readable medium storing computer executable code for wireless communication, comprising code to:
 determine a demodulation reference signal (DMRS) sequence based on a mother sequence;
 map the DMRS sequence to at least one symbol, of a set of resource blocks (RBs) in a transmission; and
 send a DMRS including the mapped DMRS sequence in the at least one symbol of the set of RBs; wherein the DMRS sequence is based on a first shift of the mother sequence for a downlink DMRS, and wherein the DMRS sequence is based on a second shift of the mother sequence for an uplink DMRS.

31. The non-transitory, computer-readable medium of claim 30, wherein the second shift is equivalent to the first shift or the second shift is different from the first shift.

* * * * *